(12) United States Patent
Khoshnevisan et al.

(10) Patent No.: US 12,114,340 B2
(45) Date of Patent: Oct. 8, 2024

(54) APPARATUS AND METHOD FOR MONITORING FOR A CONTROL SIGNAL IN A RESOURCE BLOCK

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/313,499

(22) Filed: May 6, 2021

(65) Prior Publication Data

US 2021/0377951 A1  Dec. 2, 2021

Related U.S. Application Data

(60) Provisional application No. 63/032,496, filed on May 29, 2020.

(51) Int. Cl.
*H04W 72/53* (2023.01)
*H04L 5/00* (2006.01)
*H04W 24/08* (2009.01)
*H04W 48/12* (2009.01)
(Continued)

(52) U.S. Cl.
CPC ........... *H04W 72/53* (2023.01); *H04L 5/0053* (2013.01); *H04L 5/0094* (2013.01); *H04W 24/08* (2013.01); *H04W 48/12* (2013.01); *H04W 72/0453* (2013.01); *H04W 72/23* (2023.01)

(58) Field of Classification Search
CPC ..... H04W 72/53; H04W 24/08; H04W 48/12; H04W 72/0453; H04W 72/23; H04L 5/0053; H04L 5/0094
See application file for complete search history.

(56) References Cited

U.S. PATENT DOCUMENTS

| 2014/0146768 A1* | 5/2014 | Seo ...................... H04L 27/2601 370/329 |
| 2019/0238296 A1* | 8/2019 | Hosseini ................ H04W 76/27 |
| 2020/0145075 A1* | 5/2020 | Hao .................... H04B 7/0689 |

(Continued)

FOREIGN PATENT DOCUMENTS

WO   WO-2014133642 A1 *  9/2014  ........... H04B 7/0452

*Primary Examiner* — Omar J Ghowrwal
(74) *Attorney, Agent, or Firm* — Paul M. McAdams; Polsinelli LLP

(57) ABSTRACT

Apparatus, methods, and computer-readable media for facilitating multi-cluster control resource sets for downlink control channel repetition are disclosed herein. An example method for wireless communication at a UE includes receiving a configuration for a CORESET having a first RB set associated with a first TCI state and a second RB set associated with a second TCI state. The example method also includes monitoring for a control signal in the first RB set and the second RB set. Another example method includes receiving a configuration for an SSS associated with a first CORESET having a first TCI state and a second CORESET having a second TCI state. The example method also includes monitoring for a control signal based on the configuration for the SSS.

16 Claims, 19 Drawing Sheets

(51) Int. Cl.
*H04W 72/0453* (2023.01)
*H04W 72/23* (2023.01)

(56) References Cited

U.S. PATENT DOCUMENTS

| | | | |
|---|---|---|---|
| 2020/0154295 A1* | 5/2020 | Lin | H04W 52/0216 |
| 2021/0112560 A1* | 4/2021 | Khoshnevisan | H04W 72/23 |
| 2021/0226820 A1* | 7/2021 | Khoshnevisan | H04B 7/0456 |
| 2021/0243659 A1* | 8/2021 | Cirik | H04L 5/0053 |
| 2021/0258928 A1* | 8/2021 | Khoshnevisan | H04L 5/0048 |
| 2021/0368529 A1* | 11/2021 | Sakhnini | H04W 72/51 |
| 2023/0074086 A1* | 3/2023 | Yi | H04L 1/1822 |

* cited by examiner

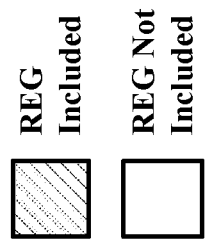
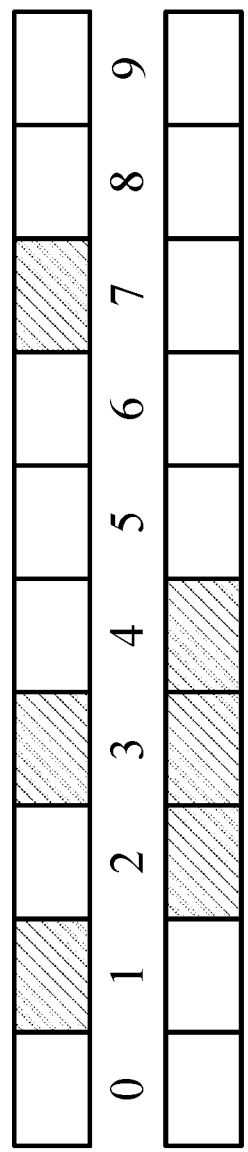
FIG. 6A
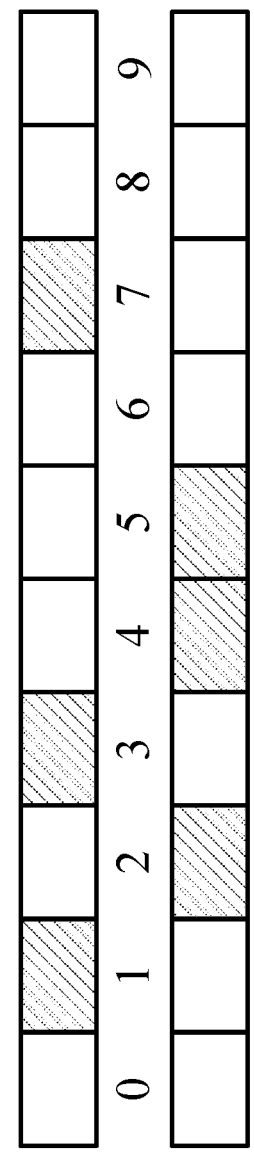
FIG. 6B
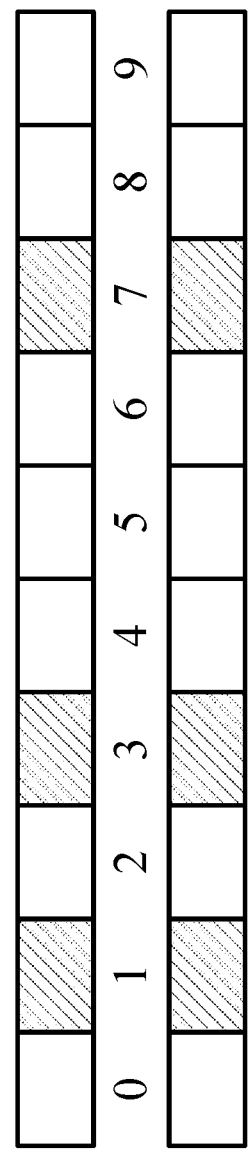
FIG. 6C

APPARATUS AND METHOD FOR MONITORING FOR A CONTROL SIGNAL IN A RESOURCE BLOCK

CROSS REFERENCE TO RELATED APPLICATION(S)

This application claims the benefit of and priority to U.S. Provisional Patent Application Ser. No. 63/032,496, entitled "Methods and Apparatus to Facilitate Multi-Cluster Control Resource Sets for Downlink Control Channel Repetition," and filed on May 29, 2020, which is expressly incorporated by reference herein in its entirety.

TECHNICAL FIELD

The present disclosure relates generally to communication systems, and more particularly, to wireless communication utilizing downlink control channel repetition.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for facilitating wireless communication at a user equipment (UE). An example apparatus receives a configuration for a control resource set (CORESET) having a first resource block (RB) set associated with a first transmission configuration indicator (TCI) state and a second RB set associated with a second TCI state. The example apparatus also monitors for a control signal in the first RB set and the second RB set. The example apparatus may also receive a search space set (SSS) configuration associated with at least one of the first RB set and the second RB set of the CORESET.

In another aspect of the disclosure, a method, a computer-readable medium, and an apparatus are provided for facilitating wireless communication at a UE. An example apparatus receives a configuration for an SSS associated with a first CORESET having a first TCI state and a second CORESET having a second TCI state. The example apparatus also monitors for a control signal based on the configuration for the SSS.

In another aspect of the disclosure, a method, a computer-readable medium, and an apparatus are provided for facilitating wireless communication at a base station. An example apparatus configures a CORESET for a UE, the CORESET having a first RB set associated with a first TCI state and a second RB set associated with a second TCI state. The example apparatus also transmits a physical downlink control channel (PDCCH) to the UE based on the CORESET configured for the UE. The example apparatus may also transmit an SSS configuration associated with at least one of the first RB set and the second RB set of the CORESET.

In another aspect of the disclosure, a method, a computer-readable medium, and an apparatus are provided for facilitating wireless communication at a base station. An example apparatus configures an SSS for a UE, the SSS being associated with a first CORESET having a first TCI state and a second CORESET having a second TCI state. The example apparatus also transmits a PDCCH to the UE based on the SSS configured for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A illustrates a first example bitmap corresponding to frequency domain resources for resource block (RB) sets of a CORESET, in accordance with one or more of the teachings disclosed herein.

FIG. 6B illustrates a second example bitmap corresponding to frequency domain resources for RB sets of a CORESET, in accordance with one or more of the teachings disclosed herein.

FIG. 6C illustrates a third example bitmap corresponding to frequency domain resources for RB sets of a CORESET, in accordance with one or more of the teachings disclosed herein.

DETAILED DESCRIPTION

Figure 1:
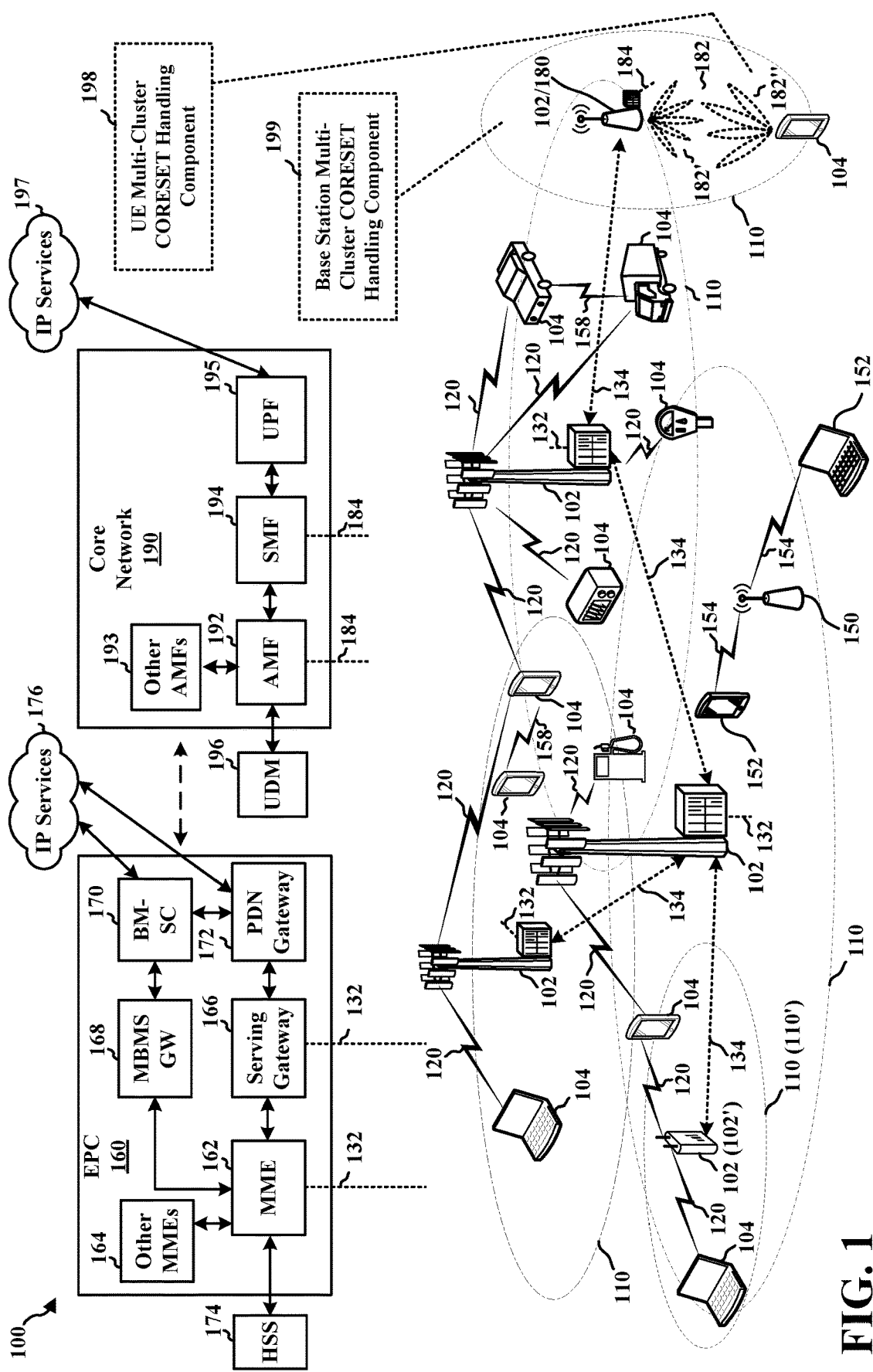
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In some examples, a wireless communication may utilize multi-TCI state downlink data channel (e.g., a physical downlink shared channel (PDSCH)) to provide improved diversity and/or reliability. In some such examples, different multi-TCI state schemes may be provided for different modes, such as a frequency division multiplexed (FDM) pattern, a time division multiplexed (TDM) pattern, or a supplemental division multiplexed (SDM) pattern. For example, different spatial layers, different resource blocks (RBs), and/or different OFDM symbols (or slots) from PDSCH resources may be associated with different respective TCI states. In some examples, DCI may indicate scheduling parameters. For example, DCI may include a TCI indicator (or TCI field) that indicates two or more TCI states associated with PDSCH.

However, there is no mechanism for PDCCH to have multiple TCI states. For example, a CORESET may include a PDCCH that is associated with one TCI state. As a result, the overall reliability of a transmission may be limited to instances in which all channels, including PDCCH, are reliable. That is, the overall reliability of a transmission is only as good as its weakest (or least reliable) channel.

Example techniques disclosed herein enable two or more TCI states for PDCCH. For example, disclosed techniques employ multi-cluster CORESETs where different clusters represent different RB sets. Additionally, each RB set may be associated with a different respective TCI state. Accordingly, example techniques disclosed herein enable multi-TCI states for PDCCH.

FIG. 1 is a diagram illustrating an example of a wireless communications system and an access network 100 including UEs 104 in communication with base stations 102 and/or base stations 180. In some examples, the UE 104 may be configured to manage one or more aspects of wireless communication by utilizing multi-TCI states for PDCCH. As an example, in FIG. 1, the UE 104 may include a UE multi-cluster CORESET handling component 198. In certain aspects, the UE multi-cluster CORESET handling component 198 may be configured to receive a configuration for a CORESET having a first RB set associated with a first TCI state and a second RB set associated with a second TCI state. The example UE multi-cluster CORESET handling component 198 may also be configured to monitor for a control signal in the first RB set and the second RB set.

In certain aspects, the UE multi-cluster CORESET handling component 198 may be configured to receive a configuration for an SSS associated with a first CORESET having a first TCI state and a second CORESET having a second TCI state. The example UE multi-cluster CORESET handling component 198 may also be configured to monitor for a control signal based on the configuration for the SSS.

Still referring to FIG. 1, in certain aspects, the base station 102/180 may be configured to manage one or more aspects of wireless communication by facilitating multi-TCI states for PDCCH. As an example, the base station 102/180 may include a base station multi-cluster CORESET handling component 199. In certain aspects, the example base station multi-cluster CORESET handling component 199 may be configured to configure a CORESET for a UE, the CORESET having a first RB set associated with a first TCI state and a second RB set associated with a second TCI state. The example base station multi-cluster CORESET handling component 199 may also be configured to transmit a PDCCH to the UE based on the CORESET configured for the UE.

In certain aspects, the base station multi-cluster CORESET handling component 199 may be configured to configure an SSS for a UE, the SSS being associated with a first CORESET having a first TCI state and a second CORESET having a second TCI state. The example base station multi-cluster CORESET handling component 199 may also be configured to transmit a PDCCH to the UE based on the SSS configured for the UE.

The aspects presented herein may enable two or more TCI states for PDCCH. For example, disclosed techniques employ multi-cluster CORESETs where different clusters represent different RB sets. Additionally, each RB set may be associated with a different respective TCI state. Accordingly, example techniques disclosed herein enable multi-TCI states for PDCCH.

Although the following description provides examples directed to 5G NR, the concepts described herein may be applicable to other similar areas, LTE, LTE-A, CDMA, GSM, and/or other wireless technologies, in which a UE may be configured to utilize multi-TCI states for PDCCH.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia™, Bluetooth™, ZigBee™, Wi-Fi™ based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
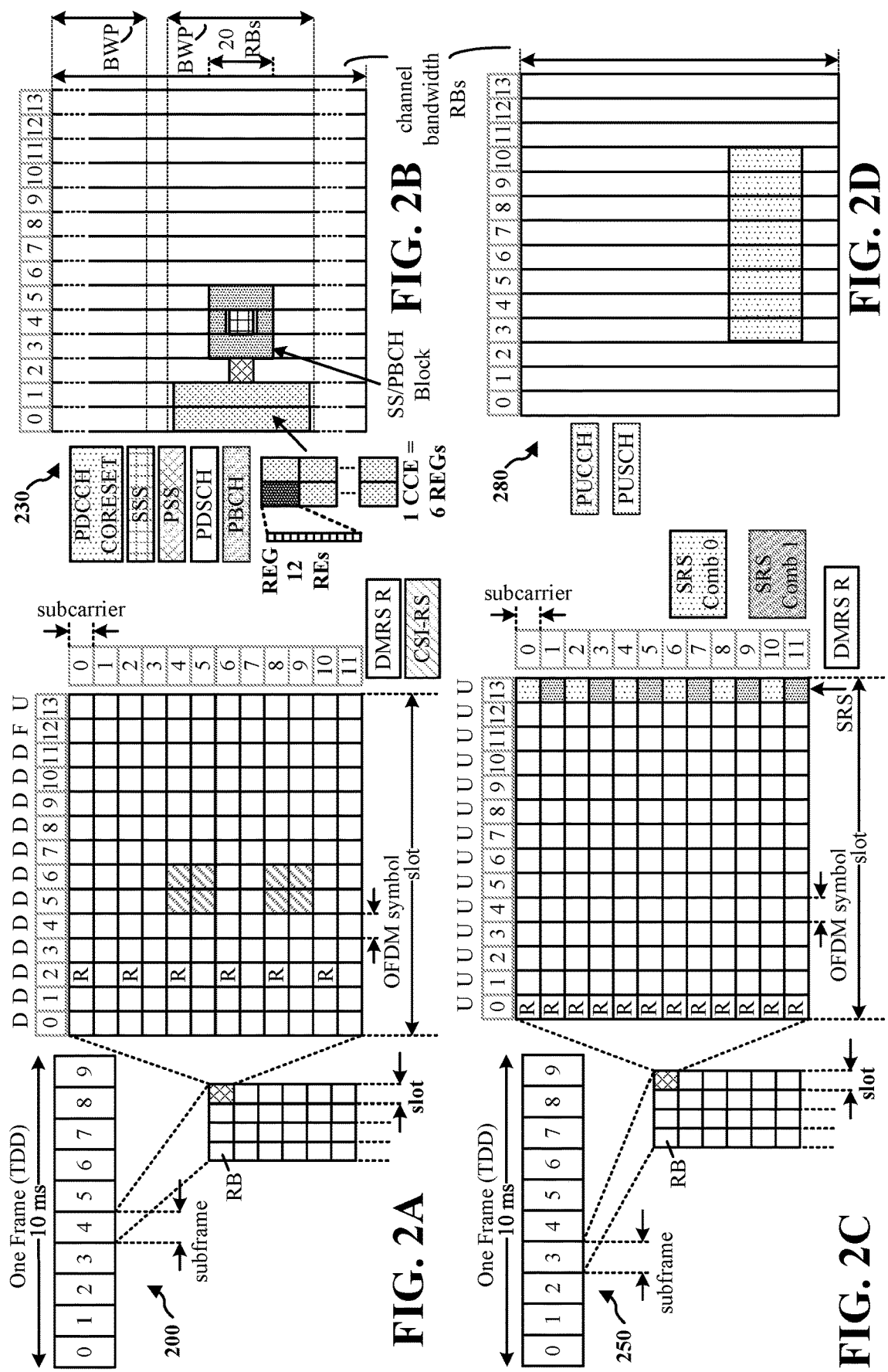
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A to 2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
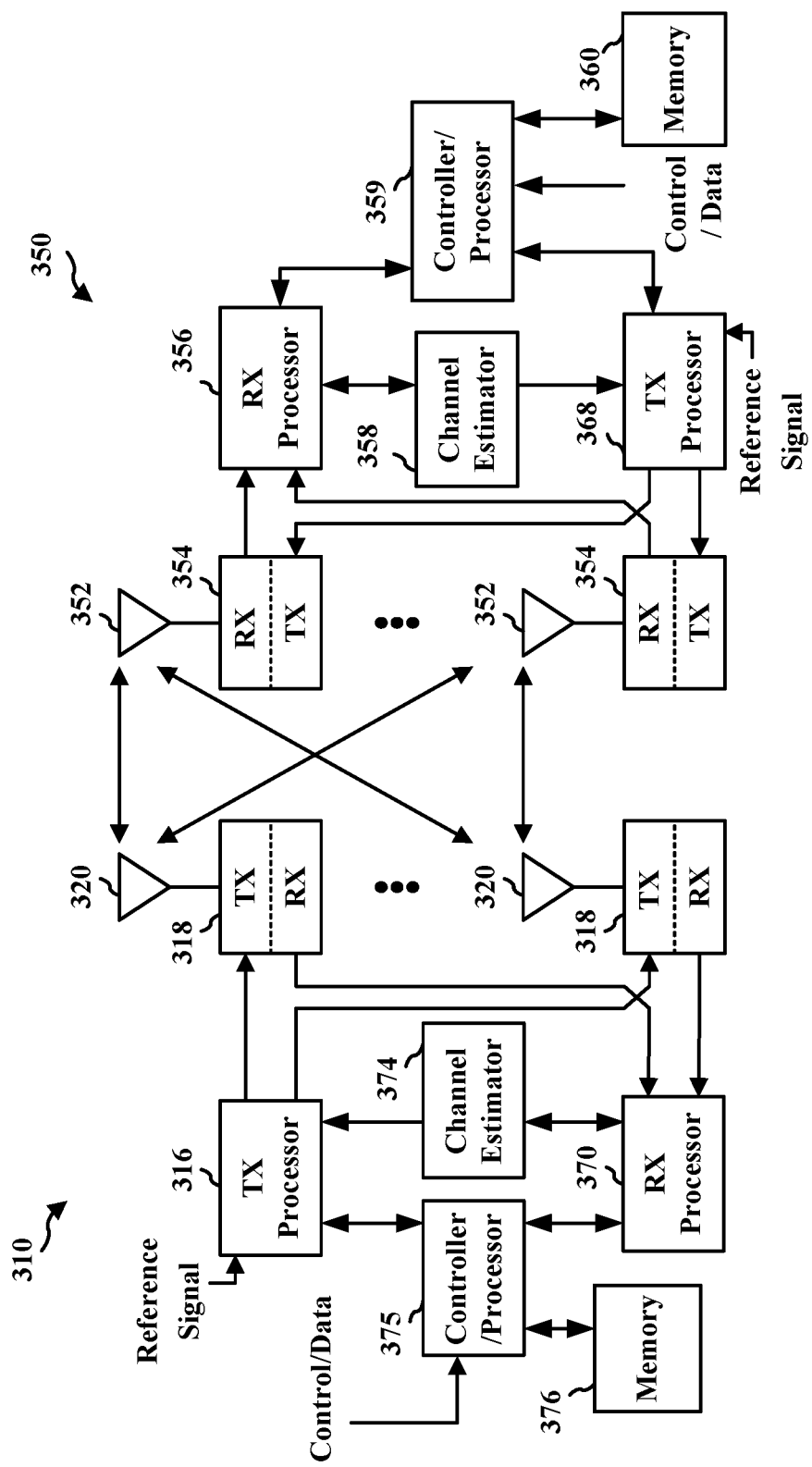
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370)

implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the example UE multi-cluster CORESET handling component 198 of FIG. 1.

At least one of the TX processor 316, the RX processor 370, and the controller/processor 375 may be configured to perform aspects in connection with the example base station multi-cluster CORESET handling component 199 of FIG. 1.

The PDCCH occupies a specific number of resource elements (REs) according to its aggregation level (AL). An AL is quantified in terms of the number of control channel elements (CCEs) that the AL occupies. One CCE is equivalent to six resource element groups (REGs), which is also equivalent to 72 resource elements. In some examples, the aggregation level may be specified based on the size of the DCI payload and the UE coverage conditions. For example, small payloads may be accommodated using lower aggregation levels. Additionally, a UE that experiences poor coverage may be allocated higher aggregation levels to allow increased channel coding gain (e.g., higher quantities of redundancy).

A search space set (SSS) may be associated with a specific CORESET. The CORESET defines the set of resource blocks (RBs) and the number of symbols available to the SSS. Each SSS may be associated with a specific periodicity. In some examples, the periodicity may impact latency because it determines the average waiting time for a resource allocation opportunity. However, in other examples, the CORESET may also define additional or alternative physical layer characteristics.

The base station may transmit control information (e.g., PDCCH) using resource elements that belong to a CORESET. In some examples, a UE may be configured with a maximum quantity of CORESETs in an active bandwidth part. For example, a UE may be configured with 3 CORESETs, 5 CORESETs, etc. Example properties of a CORESET include a TCI state for PDCCH reception, an indicator of whether a scheduling DCI in the CORESET includes a TCI field for indicating the TCI state of PDSCH ("TCI-PresentInDCI"), the resource blocks allocated to the CORESET ("frequencyDomainResources"), the quantity of symbols allocated to the CORESET (sometimes referred to as a "duration" comprising 1, 2, or 3 OFDM symbols), an indicator of a CCE to REG mapping type ("CCE-REG-MappingType"), an indicator of precoding granularity ("precoderGranularity"), and a scrambling identifier to use for PDCCH DMRS and/or coded bits of DCI ("PDCCH-DMRS-ScramblingID"). In some examples, the indicator of the precoding granularity may provide the UE with information regarding the frequency selectivity of the precoding applied by the base station. If the precoder granularity indicates same precoding weights ("sameAsREG-bundle"), then the UE may operate as if the base station applies the same precoding weights to all resource blocks within a REG bundle. If the precoding granularity indicates contiguous REG bundles ("allContiguousRBs"), then the UE may operate as if the base station applies the same precoding weights to all RBs belonging to contiguous REG bundles.

A search space may use a CORESET to define the specific resource blocks and symbols where the UE is to attempt to decode the PDCCH. In some examples, a UE may be configured with a maximum quantity of SSSs in an active bandwidth part. For example, a UE may be configured with up to ten SSSS. Example properties of an SSS include a search space identifier ("searchSpaceID"), PDCCH monitoring occasions in time for an SSS, an SSS type identifier ("searchSpaceType"), and a number of PDCCH candidates identifier ("nrofCandidates"). The search space identifier ("searchSpaceID") may provide an identifier for the SSS being configured and may be used to determine to which CORESET the SSS is associated. The PDCCH monitoring occasions in time for an SSS may include a periodicity (or timing or offset in units of slots) of the SSS ("monitoringSlotPeriodicityAndOffset"), an SSS duration ("duration") that specifies how many slots within a period the SSS exists (e.g., across how many multiple consecutive slots the SSS extends), and a PDCCH monitoring pattern within a slot ("monitoringSymbolsWithinSlot") that specifies the starting symbol(s) for the SSS within a slot. The SSS type identifier ("searchSpaceType") may indicate whether the SSS is either "common" or "UE-specific." In some examples, a first set of DCI formats may be associated with a common search space and a second set of DCI formats may be associated with a UE-specific search space. The number of PDCCH candidates identifier ("nrofCandidates") may specify the number of candidate PDCCH transmissions for each aggregation level. For example, for each SSS, there may be a number of PDCCH candidates to combine and/or decode.

Figure 4:
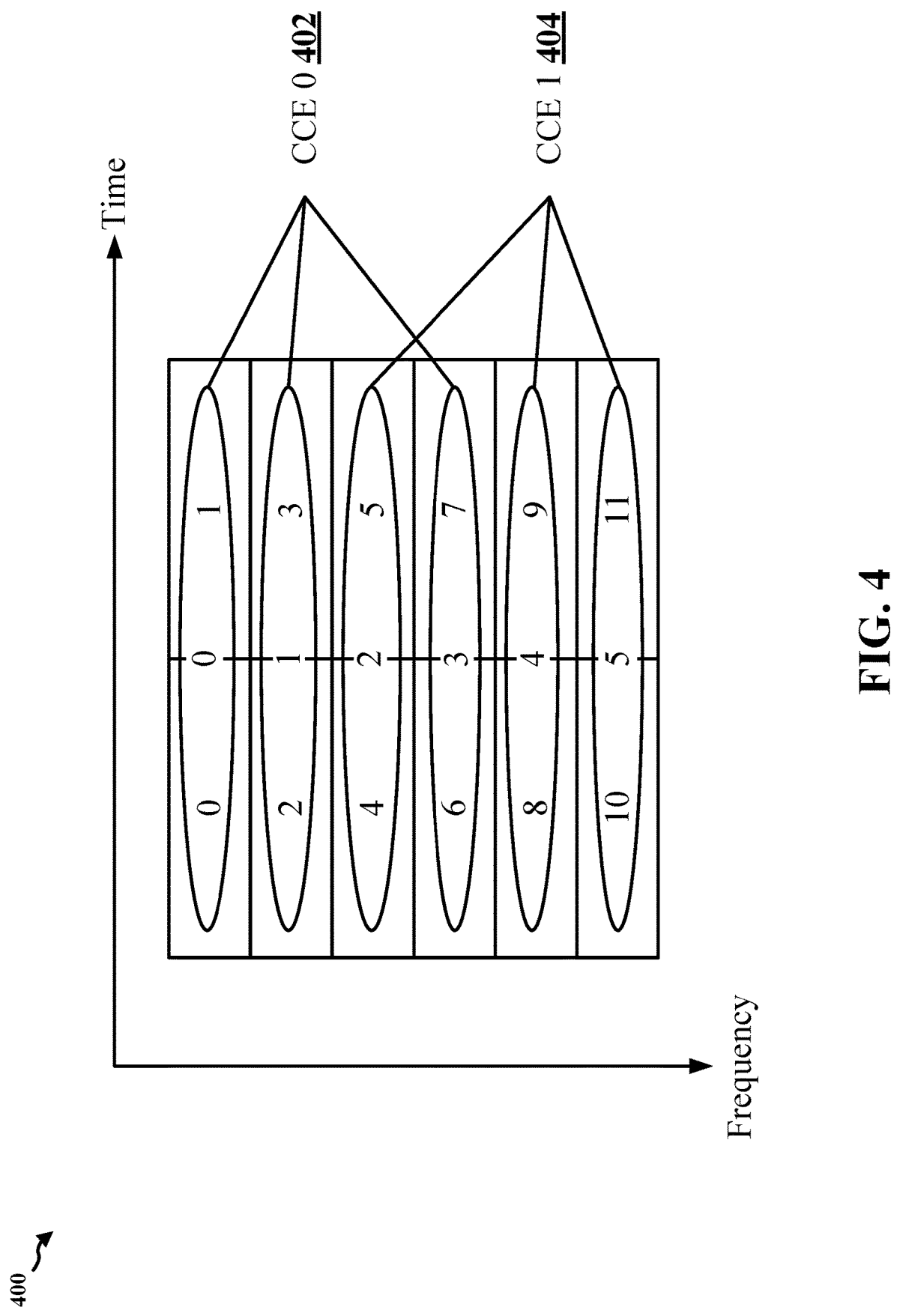
FIG. 4 illustrates an example resource element group bundle, in accordance with one or more aspects of this disclosure.

As described above, the CORESET may include an indicator of a CCE to REG mapping type ("CCE-REG-MappingType"). The resource elements belonging to a CORESET may be organized into resource element groups (REGs). A REG bundle may include L consecutive REGs, where the parameter "L" refers to a REG bundle size. It may be appreciated that "consecutive REGs" may not be limited to physically consecutive resources. In some examples, REGs in a CORESET may be numbered in a time-first, frequency-second manner. For example, FIG. 4 illustrates an example REG bundle 400 of size two (e.g., L=2). In the illustrated example, the REG bundle 400 is using two symbols (e.g., as shown along the time-axis). As shown in FIG. 4, the REG bundle 400 includes twelve REGs, where the REGs are first numbered in time (e.g., going left to right in FIG. 4) and then numbered in frequency (e.g., going from top to bottom in FIG. 4). For example, in the illustrated example of FIG. 4, in a first frequency (e.g., the top row), the left REG is numbered REG "0" and the right REG is numbered REG "1." Jumping to the next frequency (e.g., the second row), the left REG is numbered REG "2" and the right REG is numbered REG "3," etc.

The CCE to REG mapping type may be non-interleaved or interleaved. In non-interleaved CCE to REG mapping, the REG bundle size may be six (e.g., L=6) and a CCE index may be mapped to a respective REG bundle index. For example, CCE "j" may be mapped to REG bundle "j." For example, a first CCE (e.g., "CCE 0") may be mapped to REGs 0 to 5, a second CCE (e.g., "CCE 1") may be mapped to REGs 6 to 11, etc.

In interleaved CCE to REG mapping, the REG bundle size (L) may be configured. For example, if the number of symbols of the CORESET (e.g., CORESET "duration") is set to one or two, the REG bundle size may be two or six (e.g., L=2 or L=6). If the number of symbols of the CORESET (e.g., CORESET "duration") is set to three, the REG bundle size may be three or six (e.g., L=3 or L=6). In such an example, a CCE index "j" may be mapped to a REG bundle comprising the set $\{f(6j/L), f(6j/L+1), \ldots, f(6j/L+6/L-1)\}$, where the function f(*) represents an interleaver. In some examples, Equation 1 (below) may be used to determine an interleaver.

$$f(x) = (rC + C + n_{shift}) \mod \left( \frac{N_{REG}^{CORESET}}{L} \right), \quad \text{Equation 1}$$

$$x = cR + r$$

$$r = 0, 1, \ldots R - 1$$

$$c = 0, 1, \ldots, C - 1$$

$$C = N_{RET}^{CORESET}/(LR)$$

In Equation 1, the parameter "R" represents the interleaver size, sometimes referred to as an "interleaver depth." The interleaver size ("R") may be configured to determine the number of sections that the CORESET bandwidth is divided into when applying the interleaving.

Referring again to the illustrated example of FIG. 4, the interleaver size is two (e.g., R=2). Additionally, the example of FIG. 4 includes twelve REGs (e.g., REGs 0 to 11) and two CCEs. For example, a first CCE 402 (e.g., "CCE 0") includes REGs 0, 1, 2, 3, 6, and 7, and a second CCE 404 (e.g., "CCE 1") includes REGs 4, 5, 8, 9, 10, and 11.

In some examples, a PDCCH candidate with an aggregation level "L" may be mapped to L consecutive CCE indices. An aggregation level may refer to the number of CCEs are allocated for a PDCCH candidate. In some examples, the aggregation level may be configured to be 1, 2, 4, 8, or 16. In some examples, CCEs and their associated indexing may be determined as described above (e.g., based on Equation 1 (above)). As described above, it may be appreciated that consecutive indices may not correspond to physical consecutive RBs in the frequency domain. For example, as shown in FIG. 4, interleaved CCE to REG mapping may provide a CCE including REGs that are not consecutive.

In some examples, the mapping may be function of a configured aggregation level ("L"), a PDCCH candidate index and a number of PDCCH candidates with the configured aggregation level, a number of CCEs in a corresponding RB set of the CORESET, a carrier indicator field value, a slot number, a radio network temporary identifier (RNTI), and/or a CORESET index. In some examples, the slot number, the RNTI, and/or the CORESET index may be included to provide a degree of randomization across UEs in different slots. In some examples, for a search space set ("s") associated with a CORESET ("p"), the CCE indices for aggregation level L corresponding to a PDCCH candidate ("$m_{s,n_{CI}}$") of the search space set ("s") in slot ("$n_{s,f}^{\mu}$") for an active bandwidth part of a serving cell corresponding to a carrier indicator field value ("$n_{CI}$") may be given by Equation 2 (below).

$$L * \left\{ \left( Y_{p,n_{s,f}^{\mu}} + \left\lfloor \frac{m_{s,n_{CI}} * N_{CCE,p}}{L * M_{s,max}^{(L)}} \right\rfloor + n_{CI} \right) \mod \left\lfloor \frac{N_{CCE,p}}{L} \right\rfloor \right\} + i \quad \text{Equation 2}$$

In Equation 2, the parameter "i" may be a value between 0 and L−1, the parameter "$N_{CCE,p}$" represents the number of CCEs numbered from 0 to ($N_{CCE,p}$−1) in CORESET p, the parameter "$m_{s,n_{CI}}$" is a value between 0 and ($M_{s,n_{CI}}^{(L)}$−1), where ($M_{s,n_{CI}}^{(L)}$) represents the number of PDCCH candidates the UE is configured to monitor for aggregation level L of a search space set s for a serving cell corresponding to the carrier indicator field value ($n_{CI}$).

In some examples, to facilitate multi-TCI states for PDCCH, example techniques disclosed herein may facilitate configuring a CORESET with multiple RB sets, and where each RB set may be associated with a respective TCI state. In some examples, the CORESET may be configured via RRC signaling. In some examples, the CCE to REG mapping may be performed separately for each RB set. Additionally, a search space set may be associated with one RB set or multiple RB sets of a CORESET. If a search space set is associated with one RB set of a CORESET, CCEs in the associated RB set may be considered for determination and PDCCH repetition may not be provided. If a search space set is associated with more than one RB set of a CORESET, each PDCCH candidate in the search space set may be configured with a quantity of CCEs. For example, as an illustrative example, a search space set may be associated with two RB sets. In such examples, each PDCCH candidate in the search space set that is configured with aggregation level L may include x*L CCEs (e.g., where the actual aggregation level may be represented by "2*L" and where the parameter "x" represents the quantity of RB sets included in the CORESET). In some examples, each PDCCH candidate in the search space set may be configured via RRC signaling.

In some examples, CCE indices for the PDCCH candidate may be determined per RB set. For example, there may be L CCE indices in the first RB set and there may be L CCE indices in the second RB set. In some examples, within each RB set, the L CCE indices for the PDCCH candidate may be determined using Equation 2 (above). For example, the indices may be a function of the configured aggregation level, the PDCCH candidate index and the number of PDCCH candidates with the configured aggregation level, the number of CCEs in the corresponding RB set of the CORESET (e.g., the first RB set and the second RB set), the carrier indicator field value, the slot number, the RNTI, and/or the CORESET index. The UE may then decode the PDCCH candidate in the search space set based on the configuration.

Figure 5:
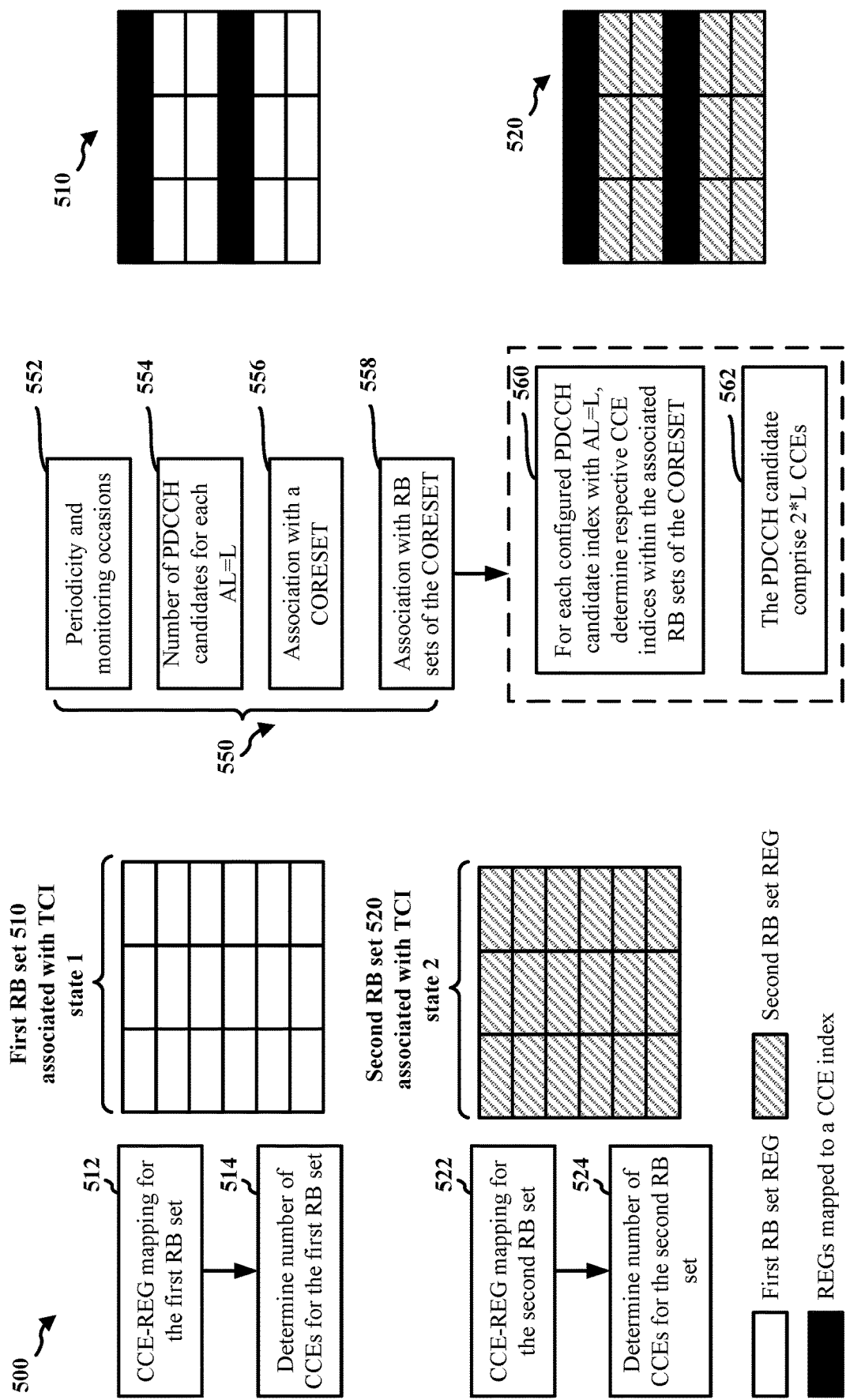
FIG. 5 illustrates an example CORESET configuration including multiple sets of resource blocks, in accordance with one or more of the teachings disclosed herein.

FIG. 5 illustrates an example CORESET configuration 500 including multiple sets of resource blocks, in accordance with one or more of the teachings disclosed herein. For example, the CORESET configuration 500 may include a first RB set 510 (sometimes referred to as a "cluster") that is associated with a first TCI state ("TCI state 1") and a second RB set 520 that is associated with a second TCI state ("TCI state 2"). A UE receiving the example CORESET configuration 500 may determine, at 512, a first CCE to REG mapping for the first RB set 510 and determine, at 514, a first number of CCEs associated with the first RB set 510. Similarly, the UE receiving the example CORESET configuration 500 may determine, at 522, a second CCE to REG mapping for the second RB set 520 and determine, at 524, a second number of CCEs associated with the second RB set 520.

As described above, a CORESET may also be associated with a search space set. For example, the example CORESET configuration 500 may be associated with an SSS configuration 550 including information related to periodicity and monitoring occasions 552, information related to a number of PDCCH candidates for each aggregation level L 554, information related to an association with a CORESET 556, and information related to an association with RB sets of the CORESET 558. Based on the SSS configuration 550, the UE may determine, at 560, for each configured PDCCH candidate index with an aggregation level L, respective CCE indices within the associated RB sets of the CORESET. For example, for an aggregation level where L is one (e.g., L=1), each PDCCH candidate is associated with one CCE and each CCE includes six REGs. As shown in FIG. 5, the PDCCH candidates associated with the first RB set 510 includes six REGs and the PDCCH candidates associated with the second RB set 520 includes six REGs. The UE may also determine, at 562, based on the CORESET configuration 500 and the SSS configuration 550, that each PDCCH candidate comprises 2*L CCEs, as there are two RB sets 510, 520. It may be appreciated that in some examples in which a CORESET includes one RB set, the PDCCH candidates associated with one CCE (e.g., when L=1) includes six REGs. However, by including multiple RB sets with a CORESET (e.g., the first RB set 510 and the second RB set 520 of FIG. 5), the PDCCH candidates associated with one CCE (e.g., when L=1) includes twelve REGs (e.g., six REGs from the first RB set 510 and six REGs from the second RB set 520).

In some examples, determining a PDCCH candidate may include performing rate matching. For example, after determining the L CCE indices in the first RB set 510 and the second RB set 520 for a given PDCCH candidate, the coded bits of the DCI may be mapped to CCEs. In some examples, the number of coded bits may be determined based on separate rate matching or based on joint rate matching. In some examples, whether to apply separate rate matching or joint rate matching may be configured per search space set via RRC signaling (e.g., for all PDCCH candidates in that search space set).

In some examples, the number of coded bits of the PDCCH candidate may be based on a set of CCEs in a single resource block set (e.g., separate rate matching). For example, the number of coded bits for separate rate matching may be determined based on the number of CCEs in the first RB set 510 or the second RB set 520 (e.g., L CCEs). In such examples, the coded bits that are mapped to CCEs indices for the PDCCH candidate in a first RB set (e.g., the first RB set 510) are also mapped to CCE indices for that PDCCH candidate in the other sets of resource blocks (e.g., the second RB set 520).

In some examples, the number of coded bits of the PDCCH candidate may be based on a combined set of CCEs in the multiple sets of resource blocks (e.g., joint rate matching). For example, the number of coded bits for joint rate matching may be determined based on the number of CCEs in both RB sets 510, 520 (e.g., 2*L CCEs). In some such examples, portions of the coded bits may be mapped to CCE indices for a PDCCH candidate in respective RB sets. For example, in the example of FIG. 5, the first half of the coded bits may be mapped to CCE indices for the PDCCH candidate in the first RB set 510 and the second half of the coded bits may be mapped to the same CCE indices for that PDCCH candidate in the second RB set 520.

As described above, the configuration for the CORESET (e.g., the CORESET configuration 500 of FIG. 5) may include one or more parameters that are applied to each RB set of the CORESET. For example, the one or more parameters may include a CCE to REG mapping type indicator ("CCE-REG-MappingType"), a precoder granularity indicator ("precoderGranularity"), and a PDCCH DMRS scrambling identifier ("PDCCH-DMRS-ScramblingID").

The CCE to REG mapping type indicator may indicate whether interleaved mapping is used or non-interleaved mapping is used. In some examples in which interleaved mapping is used, the CCE to REG mapping type indicator may also provide a REG bundle size ("REG-BundleSize"), an interleaver size ("interleaverSize"), and a cycle shift index ("shiftIndex").

The precoder granularity indicator may indicate whether wideband channel estimation (WB CE) is configured or narrowband channel estimation is configured. In some examples, when wideband channel estimation is configured ("allContiguousRBs"), for example, the UE may operate as if the base station applies the same precoding weights to all RBs belonging to contiguous REG bundles. When narrowband channel estimation is configured ("sameAsREG-bundle"), then the UE may operate as if the base station applies the same precoding weights to all resource blocks within a REG bundle.

The PDCCH DMRS scrambling identifier may provide an identifier used for scrambling sequence initialization used for PDCCH DMRS and PDCCH scrambling of the coded bits.

In some examples, the one or more parameters of the configuration for the CORESET may be configured separately for each of the RB sets. For example, each RB set of a CORESET may be configured with a respective CCE to REG mapping type indicator, a respective precoder granularity indicator, and a respective PDCCH DMRS scrambling identifier. For example, the first RB set 510 may be configured with a first CCE to REG mapping type indicator, a first precoder granularity indicator, and a first PDCCH DMRS scrambling identifier, and the second RB set 520 may be configured with a second CCE to REG mapping type indicator, a second precoder granularity indicator, and a second PDCCH DMRS scrambling identifier.

In some examples, the one or more parameters may be configured in common for each of the RB sets of the CORESET. For example, each RB set of the CORESET (e.g., the first RB set 510 and the second RB set 520 of the CORESET configuration 500) may be configured with a same CCE to REG mapping type indicator, a same precoder granularity indicator, and a same PDCCH DMRS scrambling identifier.

The configuration of the CORESET may also include a frequency domain resource indicator ("frequencyDomainResources"). The frequency domain resource indicator may be a bitmap, where each bit corresponds to a set of contiguous resources blocks (e.g., six contiguous RBs). For example, a bit of the bitmap set to a first value (e.g., a "1") may indicate that the corresponding six contiguous RBs are included in the CORESET, and the bit set to a second value (e.g., a "0") may indicate that the corresponding six contiguous RBs are absent from (e.g., not included in) the CORESET.

In some examples, separate bitmaps may be configured corresponding to the frequency domain resources for each of the multiple RB sets of the CORESET. For example, a first set of frequency domain resources for the first RB set 510 may be configured in a first bitmap and a second set of frequency domain resources for the second RB set 520 may be configured in a second bitmap. Providing separate bitmaps for the different RB sets may increase flexibility as the different RB sets may include different numbers of resource blocks and/or the RB sets may include partial overlap, no overlap, or complete overlap of the resource blocks.

FIGS. 6A, 6B, and 6C illustrate separate bitmaps corresponding to the frequency domain resources for multiple RB sets of a CORESET. In the illustrated examples of FIGS. 6A, 6B, and 6C, the respective CORESET includes two RB sets, such as the example RB sets 510, 520 of FIG. 5. The illustrated examples include a first bitmap 610, 612, 614 corresponding to the frequency domain resources for a first RB set (e.g., the example first RB set 510 of FIG. 5) and a second bitmap 620, 622, 624 corresponding to the frequency domain resources for a second RB set (e.g., the example second RB set 520 of FIG. 5). As shown, each of the bitmaps 610, 612, 614, 620, 622, 624 include ten frequency domain resource locations (e.g., indices 0 to 9) and each RB set includes three sets of six contiguous RBs.

In the illustrated example of FIG. 6A, the bitmaps 610, 620 indicate a partial overlap of the resource blocks for the first RB set and the second RB set. For example, the first bitmap 610 (e.g., (0,1,0,1,0,0,0,1,0,0)) indicates that the three sets of six contiguous RBs that correspond to frequency domain resource location indices 1, 3, and 7 are included in the first RB set. The second bitmap 620 (e.g., (0,0,1,1,1,0,0,0,0,0)) indicates that the three sets of six contiguous RBs that correspond to frequency domain resource location indices 2, 3, and 4 are included in the second RB set. As shown in FIG. 6A, the first bitmap 610 and the second bitmap 620 indicate that the RBs corresponding to the frequency domain resource location index 3 overlap.

In the illustrated example of FIG. 6B, the bitmaps 612, 622 indicate no overlap of the resource blocks for the first RB set and the second RB set. For example, the first bitmap 612 (e.g., (0,1,0,1,0,0,0,1,0,0)) indicates that the three sets of six contiguous RBs that correspond to frequency domain resource location indices 1, 3, and 7 are included in the first RB set. The second bitmap 622 (e.g., (0,0,1,0,1,1,0,0,0,0)) indicates that the three sets of six contiguous RBs that correspond to frequency domain resource location indices 2, 4, and 5 are included in the second RB set. As shown in FIG.

6B, the first bitmap 612 and the second bitmap 622 indicate an absence of overlapping RBs between the first RB set and the second RB set.

In the illustrated example of FIG. 6C, the bitmaps 614, 624 indicate a complete overlap of the resource blocks for the first RB set and the second RB set. For example, the first bitmap 614 (e.g., (0,1,0,1,0,0,0,1,0,0)) indicates that the three sets of six contiguous RBs that correspond to frequency domain resource location indices 1, 3, and 7 are included in the first RB set. The second bitmap 624 (e.g., (0,1,0,1,0,0,0,1,0,0)) also indicates that the three sets of six contiguous RBs that correspond to frequency domain resource location indices 1, 3, and 7 are included in the second RB set. As shown in FIG. 6C, the first bitmap 614 and the second bitmap 624 indicate that the RBs corresponding to the frequency domain resource location indices 1, 3, and 7 overlap.

While the improved flexibility of configuring separate bitmaps for each RB set may be beneficial, it may be appreciated that in some aspects, the separate bitmaps may increase overhead without providing additional information. For example, if the different RB sets include the same number of RBs and do not include any overlapping RBs, it may be beneficial to configure a common bitmap that indicates the frequency domain resources for each of the multiple RB sets of the CORESET.

Figures 7A, 7B:
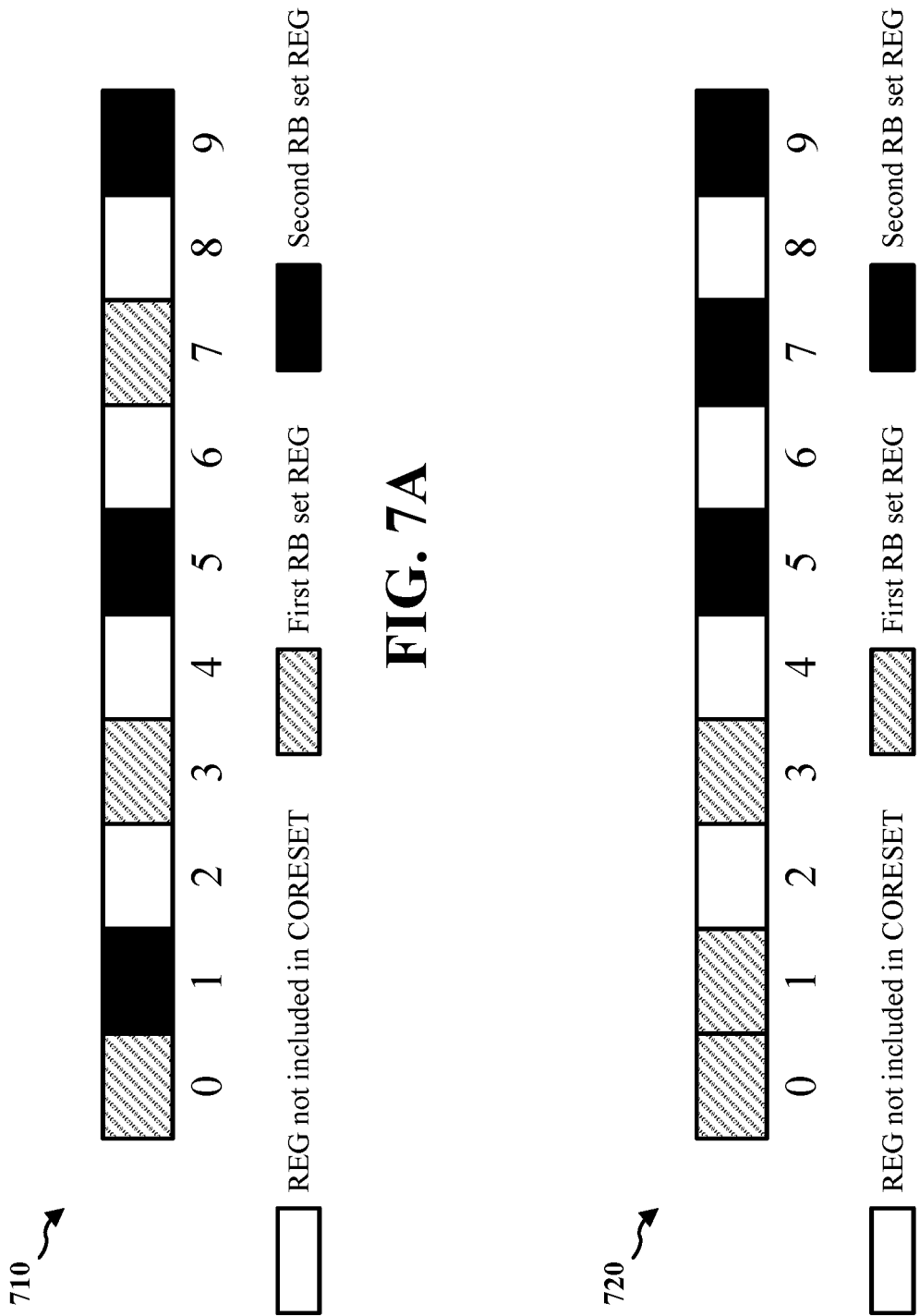
FIG. 7A illustrates a first example common bitmap corresponding to frequency domain resources for RB sets of a CORESET, in accordance with one or more of the teachings disclosed herein.
FIG. 7B illustrates a second example common bitmap corresponding to frequency domain resources for RB sets of a CORESET, in accordance with one or more of the teachings disclosed herein.

FIGS. 7A and 7B illustrate common bitmaps corresponding to the frequency domain resources for multiple RB sets of a CORESET. FIG. 7A illustrates a first bitmap 710 and FIG. 7B illustrates a second bitmap 720. In the illustrated examples of FIGS. 7A and 7B, the CORESET includes two RB sets, such as the example RB sets 510, 520 of FIG. 5. The illustrated examples include common bitmaps 710, 720 corresponding to the frequency domain resources for a first RB set (e.g., the example first RB set 510 of FIG. 5) and corresponding to the frequency domain resources for a second RB set (e.g., the example second RB set 520 of FIG. 5). As shown, each of the bitmaps 710, 720 include ten frequency domain resource locations (e.g., indices 0 to 9) and each RB set includes three sets of six contiguous RBs.

In the illustrated examples of FIGS. 7A and 7B, each of the bitmaps 710, 720 (e.g., (1,1,0,1,0,1,0,1,0,1)) indicate that the same six sets of six contiguous RBs corresponding to frequency domain resource location indices 0, 1, 3, 5, 7, and 9 are included in the CORESET. In some examples, a rule may indicate a pattern for determining which of the indicated RBs are associated with respective sets of resource blocks. For example, the pattern may be based on an alternating pattern or a grouping pattern. In some examples, the pattern may be included in the configuration for the CORESET (e.g., via RRC signaling).

In the illustrated example of FIG. 7A, an alternating pattern is used for determining which of the indicated RBs are associated with respective sets of resource blocks. For example, the first, third, and fifth sets of six contiguous RBs may be part of the first RB set and the second, fourth, and sixth sets of six contiguous RBs may be part of the second RB set. As shown in FIG. 7A, the sets of contiguous RBs corresponding to frequency domain resource location indices 0, 3, and 7 are included in the first RB set of the CORESET and the sets of contiguous RBs corresponding to frequency domain resource location indices 1, 5, and 9 are included in the second RB set of the CORESET.

In the illustrated example of FIG. 7B, a grouping pattern is used for determining which of the indicated RBs are associated with respective sets of resource blocks. For example, the first three sets of contiguous RBs may be part of the first RB set and the second three sets of contiguous RBs may be part of the second RB set. As shown in FIG. 7B, the sets of contiguous RBs corresponding to frequency domain resource location indices 0, 1, and 3 are included in the first RB set of the CORESET and the sets of contiguous RBs corresponding to frequency domain resource location indices 5, 7, and 9 are included in the second RB set of the CORESET.

However, it may be appreciated that other examples may include additional or alternate techniques for determining which of the indicated RBs in a common bitmap may be associated with respective sets of resource blocks.

In some examples, to facilitate multiple TCI states for PDCCH, example techniques disclosed herein may facilitate configuring a search space set that may be associated with different CORESETs, and where each CORESET may be associated with a respective TCI state. For example, a search space set may be associated with a first CORESET having a first TCI state and a second CORESET having a second TCI state. In some examples, the CCE to REG mapping may be performed separately for each CORESET. In some examples, each PDCCH candidate in the search space set that is configured (e.g., via RRC signaling) with aggregation level L may comprise x*L CCEs, where the parameter "x" represents the quantity of CORESETs. In some examples, the CCE indices for the PDCCH candidate may be determined per associated CORESET. For example, a first set of L CCE indices may be determined for a first CORESET and a second set of L CCE indices may be determined for a second CORESET. As described above, within a CORESET, the L CCE indices for the PDCCH candidates may be determined using, for example, Equation 2 (above). The UE may then decode the PDCCH candidate in the SSS based on the above determinations.

In some examples, rate matching may be performed after determining the L CCE indices in each of the CORESETs (e.g., a first CORESET and a second CORESET) for a given PDCCH candidate. For example, the coded bits of DCI may be mapped to CCEs. In some examples, the number of coded bits may be determined based on separate rate matching or based on joint rate matching. In some examples, whether to apply separate rate matching or joint rate matching may be configured per search space set via RRC signaling (e.g., for all PDCCH candidates in that search space set).

In some examples, the number of coded bits of the PDCCH candidate may be based on a single set of CCE indices (e.g., separate rate matching). For example, the number of coded bits for separate rate matching may be determined based on the number of CCEs in a first CORESET (e.g., L CCEs). In such examples, the coded bits that are mapped to CCEs indices for the PDCCH candidate in a first CORESET may also be mapped to CCE indices for that PDCCH candidate in the other CORESETs.

In some examples, the number of coded bits of the PDCCH candidate may be based on a combined set of CCEs of the multiple CORESETs (e.g., joint rate matching). For example, the number of coded bits for joint rate matching may be determined based on the number of CCEs in each of the CORESETs (e.g., x*L CCEs). In some such examples, portions of the coded bits may be mapped to CCE indices for a PDCCH candidate in respective CORESETs. For example, the first half of the coded bits may be mapped to CCE indices for the PDCCH candidate in a first of two CORESETs and the second half of the coded bits may be mapped to the same CCE indices for that PDCCH candidate in the second CORESET.

Figure 8:
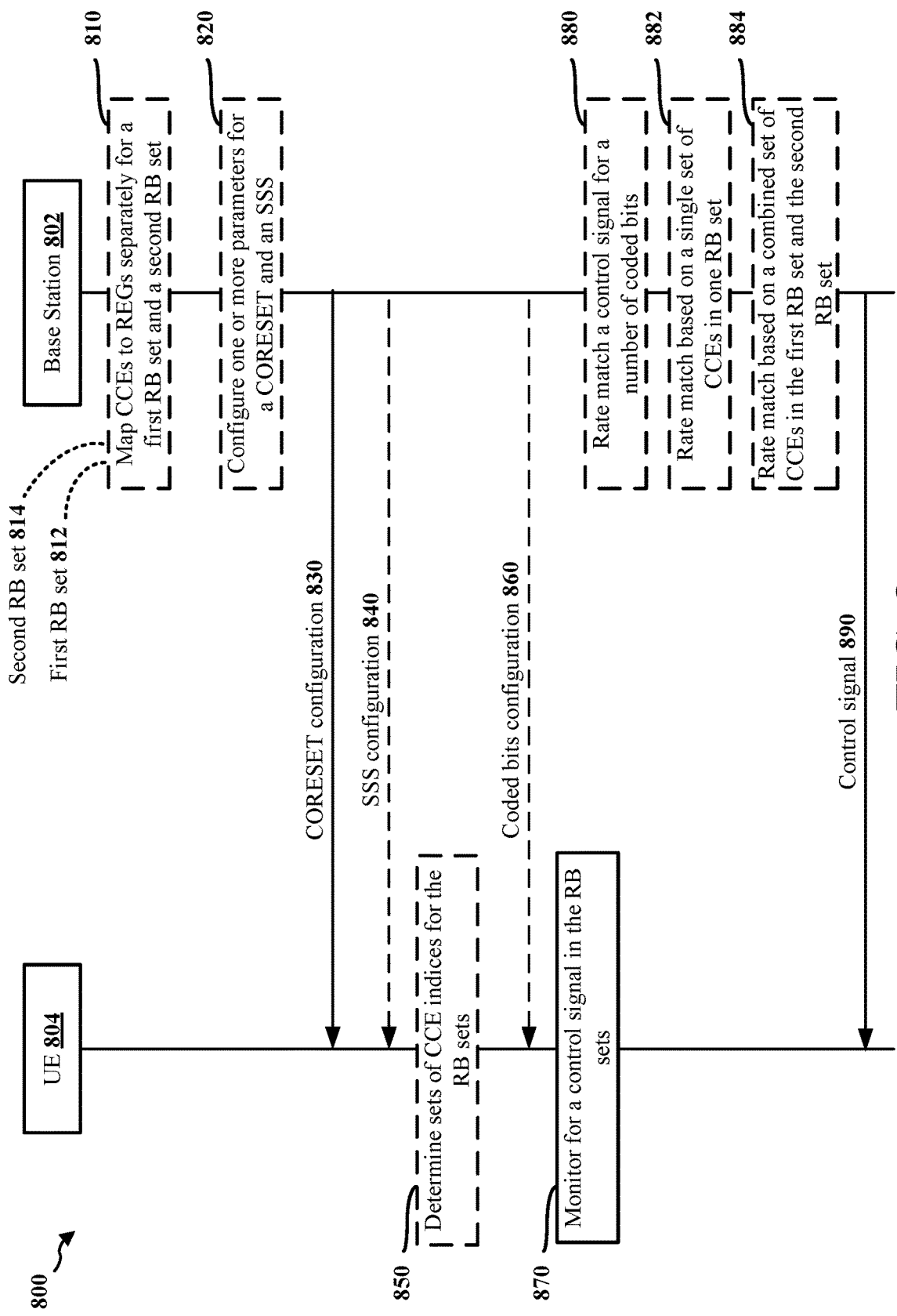
FIG. 8 is an example communication flow between a base station and a UE, in accordance with one or more aspects of this disclosure.

FIG. 8 illustrates an example communication flow 800 between a base station 802 and a UE 804, in accordance with one or more techniques disclosed herein. Aspects of the base station 802 may be implemented by the base station 102, the base station 180, and/or the base station 310. Aspects of the UE 804 may be implemented by the UE 104 and/or the UE 350. Although not shown in the illustrated example of FIG. 8, it may be appreciated that in additional or alternative examples, the base station 802 may be in communication with one or more other base stations or UEs, and/or the UE 804 may be in communication with one or more other base stations or UEs.

Although the following description provides examples of a CORESET configuration including two RB sets (e.g., the example first RB set 510 and the example second RB set 520 of FIG. 5), the concepts described herein may be applicable to any suitable quantity of RB sets.

At 810, the base station 802 may map CCEs to REGs separately for a first RB set 812 and a second RB set 814. In some examples, the base station 802 may determine a first set of CCE indices for the first RB set and a second set of CCE indices for the second RB set.

At 820, the base station 802 may configure one or more parameters for a CORESET and an SSS. In some examples, the one or more parameters for the CORESET may include a CCE to REG mapping type indicator, a precoder granularity indicator, and a PDCCH DMRS scrambling identifier. In some examples, the base station 802 may configure the one or more parameters separately for the first RB set 812 and the second RB set 814. In some examples, the base station 802 may configure the one or more parameters in common for the first RB set 812 and the second RB set 814.

In some examples, the base station 802 may configure a first set of frequency domain resources for the first RB set 812 and a second set of frequency domain resources for the second RB set 814. In some examples, the base station 802 may configure the first set of frequency domain resources based on a first bitmap and may configure the second set of frequency domain resources based on a second bitmap, as described above in connection with the bitmaps 610, 620 of FIG. 6A, the bitmaps 612, 622 of FIG. 6B, and/or the bitmaps 614, 624 of FIG. 6C. In some examples, the base station 802 may configure the first set of frequency domain resources and the second set of frequency domain resources based on a common bitmap, as described above in connection with the first bitmap 710 of FIG. 7A and/or the second bitmap 720 of FIG. 7B. In some examples, the first set of frequency domain resources and the second set of frequency domain resources are based on the common bitmap and a rule that indicates a pattern. For example, the pattern may be based on an alternating pattern (e.g., as described above in connection with the first bitmap 710 of FIG. 7A) or a grouping pattern (e.g., as described above in connection with the second bitmap 720 of FIG. 7B). In some examples, the base station 802 may include an indication of the pattern in the configuration of the CORESET.

The base station 802 transmits a CORESET configuration 830 that is received by the UE 804. The CORESET configuration 830 may include a first RB set 812 associated with a first TCI state, such as the first RB set 510 of FIG. 5 associated with the TCI state 1, and may include a second RB set 814 associated with a second TCI state, such as the second RB set 520 of FIG. 5 associated with the TCI state 2. The CORESET configuration 830 may include the one or more configured parameters for the CORESET (e.g., at 820).

In some examples, the CORESET configuration 830 may include an indication of a pattern associated with a common bitmap.

In some examples, the base station 802 may transmit an SSS configuration 840 that is received by the UE 804. The SSS configuration 840 may indicate an SSS and be associated with at least one of the first RB set 812 and the second RB set 814 of the CORESET. In some examples, the SSS may be associated with a single RB set of the CORESET. In some such examples, a PDCCH candidate may be based on RBs of the single RB set. In some examples, the SSS may be associated with multiple RB sets of the CORESET. In some such examples, a number of CCEs for a PDCCH candidate may be a multiple of a configured aggregation level L.

At 850, the UE 804 may determine sets of CCE indices for the RB sets 812, 814. In some examples, the UE 804 may apply Equation 2 (above) to determine the sets of CCE indices for the RB sets 812, 814. In some examples, a CCE to REG mapping may be separate for the first RB set 812 and the second RB set 814. In some examples, the CCE indices for the PDCCH candidate may be determined for the first RB set 812 and the second RB set 814 based on one or more of the configured aggregation level, a PDCCH candidate index and a number of PDCCH candidates with the configured aggregation level, a number of CCEs in a corresponding RB set of the CORESET, a carrier indicator field value, a slot number, an RNTI, or a CORESET index.

In some examples, the base station 802 may transmit a coded bits configuration 860 that is received by the UE 804. In some examples, the coded bits configuration 860 may indicate to the UE 804 whether a number of coded bits of the PDCCH are based on CCEs in a single RB set or based on a combined set of CCEs in the first RB set 812 and the second RB set 814.

At 870, the UE 804 monitors for a control signal in the RB sets. For example, the UE 804 may monitor for PDCCH candidates based on the RB sets 812, 814 and the respective CCE to REG mappings. In some examples, a number of coded bits of a PDCCH candidate may be based on a set of CCEs in a single RB set (e.g., one of the first RB set 812 or the second RB set 814). In some examples, a number of coded bits of a PDCCH candidate may be based on a combined set of CCEs in the first RB set 812 and the second RB set 814. In some examples, the UE 804 may use the coded bits configuration 860 to determine whether the number of coded bits of the PDCCH are based on CCEs in a single RB set or based on a combined set of CCEs.

At 880, the base station 802 may rate match a control signal 890 for a number of coded bits. The base station 802 may rate match based on a single set of CCEs or a combined set of CCEs. For example, at 882, the base station 802 may rate match the PDCCH for a number of coded bits based on a single set of CCEs in one RB set (e.g., one of the first RB set 812 or the second RB set 814). At 884, the base station 802 may rate match the PDCCH for a number of coded bits based on a combined set of CCEs in the first RB set 812 and the second RB set 814.

The base station 802 transmits the control signal 890 that is received by the UE 804. For example, the base station 802 may transmit a PDCCH to the UE 804 based on the CORESET configuration 830. The UE 804 may receive the control signal 890 based on the monitoring in the RB sets 812, 814 (e.g., at 870).

Figure 9:
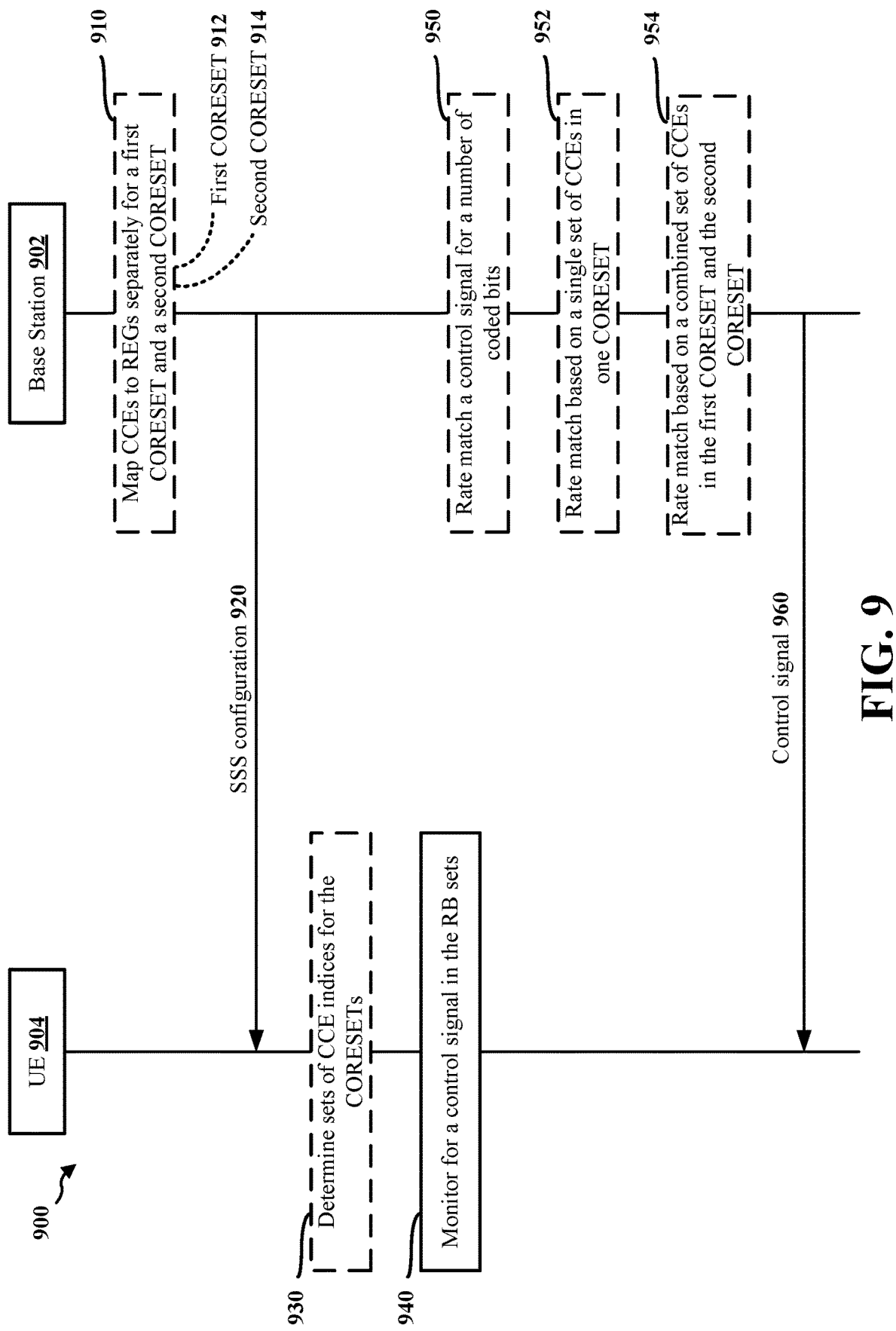
FIG. 9 is an example communication flow between a base station and a UE, in accordance with one or more aspects of this disclosure.

FIG. 9 illustrates an example communication flow 900 between a base station 902 and a UE 904, in accordance with one or more techniques disclosed herein. Aspects of the base station 902 may be implemented by the base station 102, the base station 180, the base station 310, and/or the base station 802. Aspects of the UE 904 may be implemented by the UE 104, the UE 350, and/or the UE 804. Although not shown in the illustrated example of FIG. 9, it may be appreciated that in additional or alternative examples, the base station 902 may be in communication with one or more other base stations or UEs, and/or the UE 904 may be in communication with one or more other base stations or UEs.

Although the following description provides examples of an SSS configuration including two CORESETs, the concepts described herein may be applicable to any suitable quantity of CORESETs.

At 910, the base station 902 may map CCEs to REGs separately for a first CORESET 912 and a second CORESET 914. In some examples, the base station 902 may determine a first set of CCE indices for the first CORESET 912 and a second set of CCE indices for the second CORESET 914.

The base station 902 transmits an SSS configuration 920 that is received by the UE 904. The base station 902 may transmit the SSS configuration 920 to configure the SSS for the UE 904. The SSS may be associated with the first CORESET 912 having a first TCI state and the second CORESET 914 having a second TCI state.

At 930, the UE 904 may determine sets of CCE indices for the CORESETs 912, 914. In some examples, the UE 904 may apply Equation 2 (above) to determine the sets of CCE indices for the CORESETs 912, 914. In some examples, a CCE to REG mapping may be separate for the first CORESET 912 and the second CORESET 914. In some examples, the UE 904 may determine a first set of L CCE indices for the first CORESET 912 and a second set of L CCE indices for the second CORESET 914. In some examples, a control signal candidate (e.g., a PDCCH candidate) having an aggregation level L may include x*L CCEs, where the variable "x" represents the quantity of CORESETs included in the SSS.

At 940, the UE 904 monitors for a control signal based on the configuration of the SSS received via the SSS configuration 920. For example, the UE 904 may monitor for PDCCH candidates based on the determined sets of CCEs indices for the first CORESET 912 and the second CORESET 914 (e.g., at 930). In some examples, a number of coded bits of a PDCCH candidate may be based on a single set of CCE indices. In some examples, a number of coded bits of a PDCCH candidate may be based on a combination of the first set of L CCE indices and the second set of L CCE indices (e.g., as described at 930).

At 950, the base station 902 may rate match a control signal 960 for a number of coded bits. The base station 902 may rate match based on a single set of CCEs or a combined set of CCEs. For example, at 952, the base station 802 may rate match the PDCCH for a number of coded bits based on a single set of CCEs in one CORESET (e.g., one of the first CORESET 912 or the second CORESET 914). At 954, the base station 802 may rate match the PDCCH for a number of coded bits based on a combined set of CCEs in the first CORESET 912 and the second CORESET 914.

The base station 902 transmits the control signal 960 that is received by the UE 904. For example, the base station 902 may transmit a PDCCH to the UE 904 based on the SSS configured using the SSS configuration 920. The UE 904 may receive the control signal 960 based on the monitoring in the RB sets (e.g., at 940).

Figure 10:
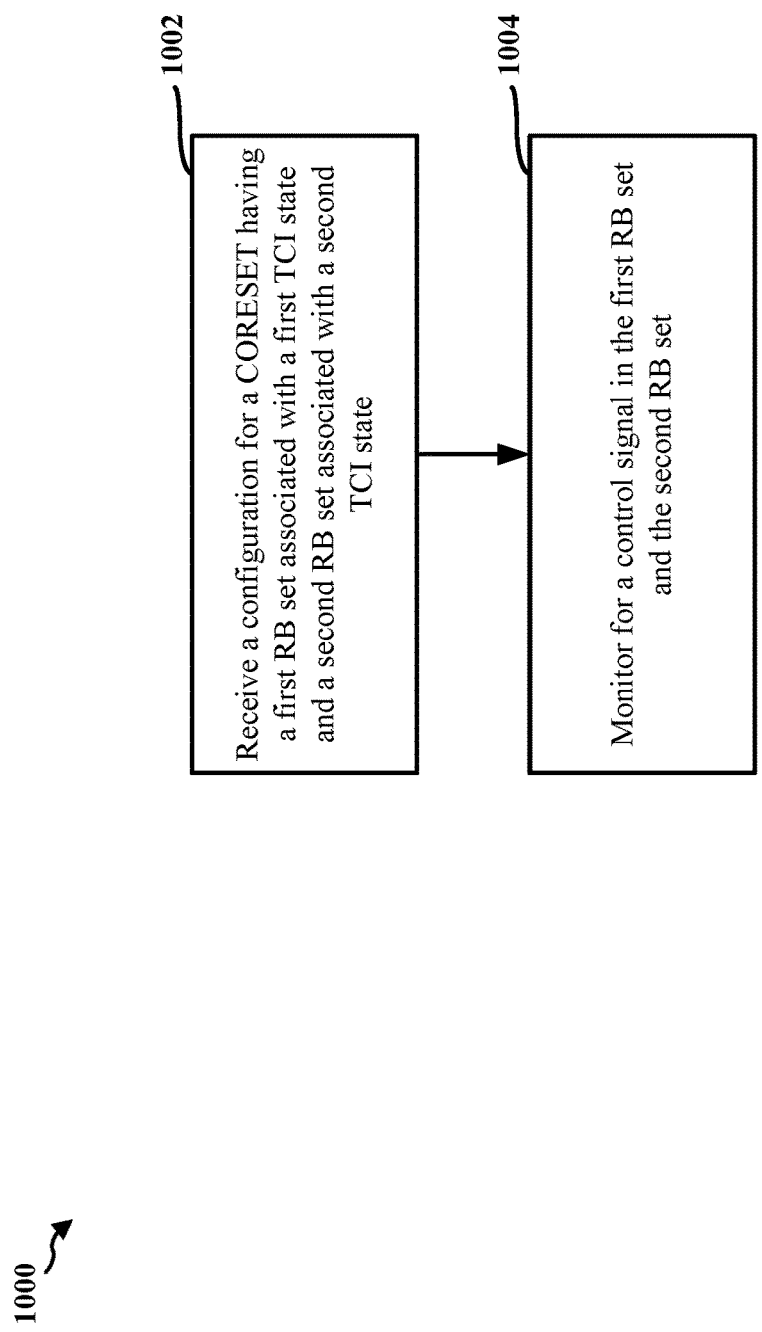
FIG. 10 is a flowchart of a method of wireless communication at a UE, in accordance with the teachings disclosed herein.

FIG. 10 is a flowchart 1000 of a method of wireless communication. The method may be performed by a UE (e.g., the UE 104, the UE 350, and/or an apparatus 1402 of FIG. 14). The method may enable a UE to apply multiple TCI states when monitoring for a control signal.

At 1002, the UE receives a configuration for a CORESET having a first set of RB sets associated with a first TCI state and a second RB set associated with a second TCI state, as described above in connection with the CORESET configuration 830 of FIG. 8. For example, 1002 may be performed by a reception component 1430 of the apparatus 1402 of FIG. 14 and/or a CORESET configuration component 1440 of the apparatus 1402 of FIG. 14. In some examples, a CCE to REG mapping may be separate for the first RB set and the second RB set. In some examples, the configuration for CORESET may include one or more parameters including a CCE to REG mapping type, a precoder granularity, or a PDCCH DMRS scrambling identifier. In some examples, the one or more parameters may be configured separately for the first RB set and the second RB set. In some examples, the one or more parameters may be configured in common for the first RB set and the second RB set.

In some examples, a first set of frequency domain resources for the first RB set may be configured in a first bitmap and a second set of frequency domain resources for the second RB set may be configured in a second bitmap, as described above in connection with FIGS. 6A, 6B, and/or 6C. In some examples, the first set of frequency domain resources for the first RB set and the second set of frequency domain resources for the second RB set may be configured in a common bitmap, as described above in connection with FIGS. 7A and/or 7B. In some examples, the first set of frequency domain resources and the second set of frequency domain resources may be based on the common bitmap and a rule that indicates a pattern. In some examples, the pattern may be based on an alternating pattern (e.g., as described above in connection with FIG. 7A) or a grouping pattern (e.g., as described above in connection with FIG. 7B). In some such examples, the pattern may include a first half and a second half of groups of RBs indicated in the common bitmap.

At 1004, the UE monitors for a control signal in the first RB set and the second RB set, as described above in connection with 870 of FIG. 8. For example, 1012 may be performed by a monitoring component 1450 of the apparatus 1402 of FIG. 14.

Figure 11:
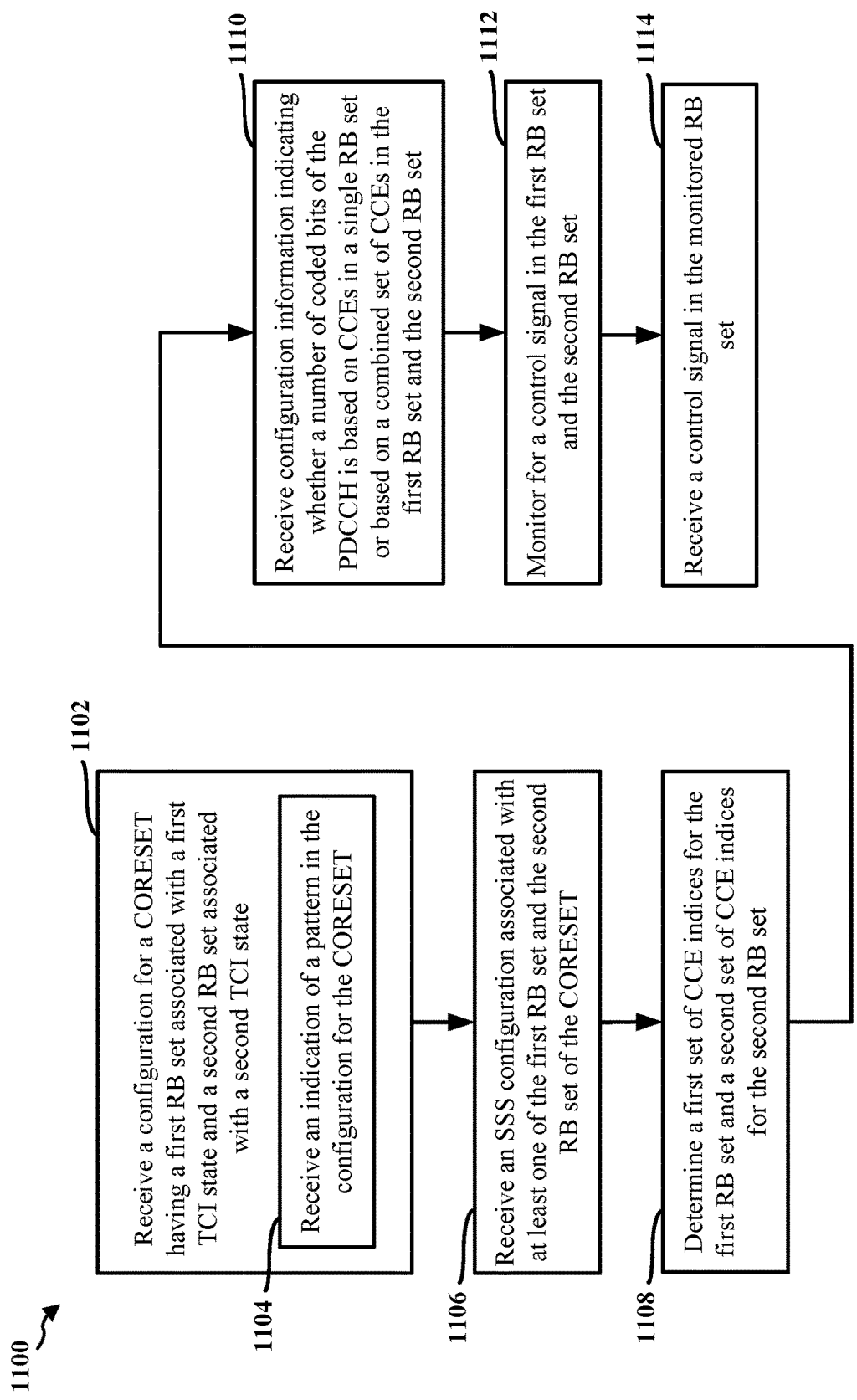
FIG. 11 is a flowchart of a method of wireless communication at a UE, in accordance with the teachings disclosed herein.

FIG. 11 is a flowchart 1100 of a method of wireless communication. The method may be performed by a UE (e.g., the UE 104, the UE 350, and/or an apparatus 1402 of FIG. 14). The method may enable a UE to apply multiple TCI states when monitoring for a control signal.

At 1102, the UE receives a configuration for a CORESET having a first set of RB sets associated with a first TCI state and a second RB set associated with a second TCI state, as described above in connection with the CORESET configuration 830 of FIG. 8. For example, 1102 may be performed by a reception component 1430 of the apparatus 1402 of FIG. 14 and/or a CORESET configuration component 1440 of the apparatus 1402 of FIG. 14. In some examples, a CCE to REG mapping may be separate for the first RB set and the second RB set. In some examples, the configuration for CORESET may include one or more parameters including a CCE to REG mapping type, a precoder granularity, or a PDCCH DMRS scrambling identifier. In some examples, the one or more parameters may be configured separately for the first RB set and the second RB set. In some examples, the one or more parameters may be configured in common for the first RB set and the second RB set.

In some examples, a first set of frequency domain resources for the first RB set may be configured in a first bitmap and a second set of frequency domain resources for the second RB set may be configured in a second bitmap, as described above in connection with FIGS. 6A, 6B, and/or 6C. In some examples, the first set of frequency domain resources for the first RB set and the second set of frequency domain resources for the second RB set may be configured in a common bitmap, as described above in connection with FIGS. 7A and/or 7B. In some examples, the first set of frequency domain resources and the second set of frequency domain resources may be based on the common bitmap and a rule that indicates a pattern. In some examples, the pattern may be based on an alternating pattern (e.g., as described above in connection with FIG. 7A) or a grouping pattern (e.g., as described above in connection with FIG. 7B). In some such examples, the pattern may include a first half and a second half of groups of RBs indicated in the common bitmap.

In some examples, the UE may receive, at 1104, an indication of the pattern in the configuration for the CORESET, as described above in connection with the CORESET configuration 830 of FIG. 8. For example, 1104 may be performed by the reception component 1430 and/or a bitmap pattern handling component 1442 of the apparatus 1402 of FIG. 14.

At 1106, the UE may receive an SSS configuration associated with at least one of the first RB set and the second RB set of the CORESET, as described above in connection with the SSS configuration 840 of FIG. 8. For example, 1106 may be performed by the reception component 1430 and/or an SSS configuration component 1444 of the apparatus 1402 of FIG. 14. In some examples, the SSS may be associated with a single RB set of the CORESET. In such examples, a PDCCH candidate may be based on RBs of the single RB set. In some examples, the SSS may be associated with multiple RB sets of the CORESET. In such examples, a number of CCEs for a PDCCH candidate may be a multiple of a configured aggregation level.

At 1108, the UE may determine a first set of CCE indices for the first RB set and a second set of CCE indices for the second RB set, as described above in connection with 850 of FIG. 8. For example, 1108 may be performed by a CCE indices component 1446 of the apparatus 1402 of FIG. 14. In some examples, CCE indices for the PDCCH candidate may be determined for the first RB set and for the second RB set based on one or more of the configured AL, a PDCCH candidate index and a number of PDCCH candidates with the configured AL, a number of CCEs in a corresponding RB set of the CORESET, a carrier indicator field value, a slot number, an RNTI, or a CORESET index.

At 1110, the UE may receive configuration information indicating whether a number of coded bits of the PDCCH are based on CCEs in a single RB set or based on a combined set of CCEs in the first RB set and the second RB set, as described above in connection with the coded bits configuration 860 of FIG. 8. For example, 1110 may be performed by the reception component 1430 and/or a coded bits configuration component 1448 of the apparatus 1402 of FIG. 14. In some examples, the number of coded bits of the PDCCH candidate may be based on a set of CCEs in a single RB set. In some examples, the number of coded bits of the PDCCH candidate may be based on a combined set of CCEs in the first RB set and the second RB set.

At 1112, the UE monitors for a control signal in the first RB set and the second RB set, as described above in connection with 870 of FIG. 8. For example, 1112 may be performed by a monitoring component 1450 of the apparatus 1402 of FIG. 14.

At 1114, the UE may receive a control signal in the monitored RB set, as described in connection with the control signal 890 of FIG. 8. For example, 1114 may be performed by the reception component 1430 and/or a control signal component 1452 of the apparatus 1402 of FIG. 14.

Figure 12:
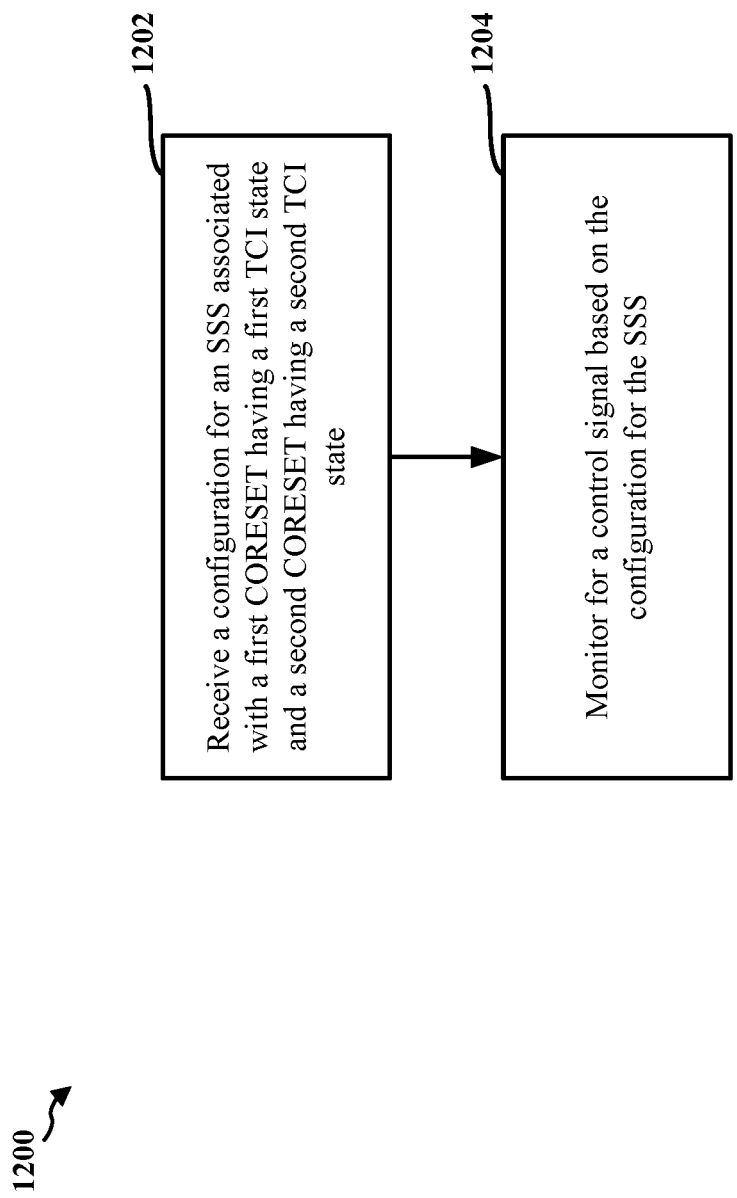
FIG. 12 is a flowchart of a method of wireless communication at a UE, in accordance with the teachings disclosed herein.

FIG. 12 is a flowchart 1200 of a method of wireless communication. The method may be performed by a UE (e.g., the UE 104, the UE 350, and/or an apparatus 1402 of FIG. 14). The method may enable a UE to apply multiple TCI states when monitoring for a control signal.

At 1202, the UE receives a configuration for an SSS associated with a first CORESET having a first TCI state and a second CORESET having a second TCI state, as described above in connection with the SSS configuration 920 of FIG. 9. For example, 1202 may be performed by a reception component 1430 of the apparatus 1402 of FIG. 14 and/or an SSS configuration component 1444 of the apparatus 1402 of FIG. 14. In some examples, a CCE to REG mapping may be separate for the first CORESET and the second CORESET. In some examples, a PDCCH candidate having an aggregation level L may include 2*L CCEs, where the value "2" represents the two CORESETs associated with the SSS.

At 1204, the UE monitors for a control signal based on the configuration for the SSS, as described above in connection with 940 of FIG. 9. For example, 1206 may be performed by a monitoring component 1450 of the apparatus 1402 of FIG. 14.

Figure 13:
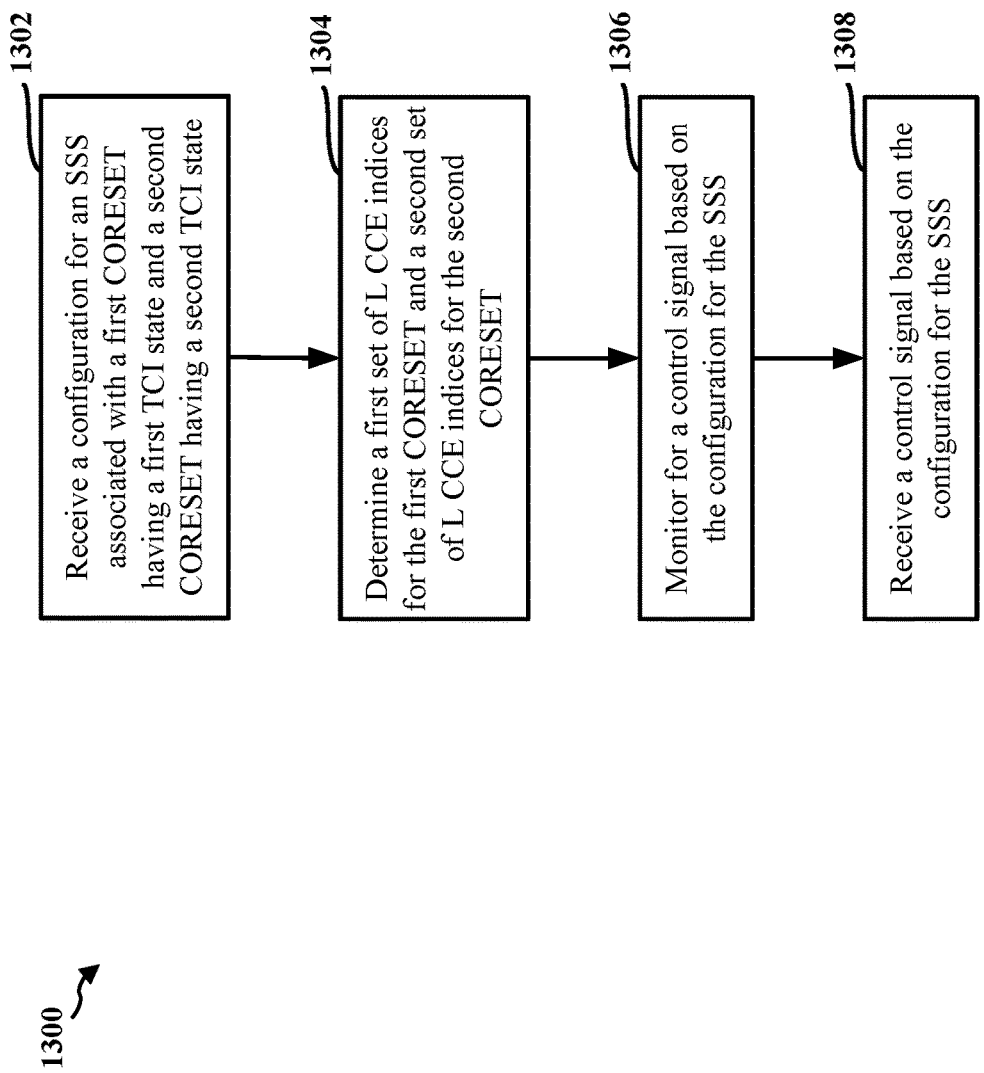
FIG. 13 is a flowchart of a method of wireless communication at a UE, in accordance with the teachings disclosed herein.

FIG. 13 is a flowchart 1300 of a method of wireless communication. The method may be performed by a UE (e.g., the UE 104, the UE 350, and/or an apparatus 1402 of FIG. 14). The method may enable a UE to apply multiple TCI states when monitoring for a control signal.

At 1302, the UE receives a configuration for an SSS associated with a first CORESET having a first TCI state and a second CORESET having a second TCI state, as described above in connection with the SSS configuration 920 of FIG. 9. For example, 1302 may be performed by a reception component 1430 of the apparatus 1402 of FIG. 14 and/or an SSS configuration component 1444 of the apparatus 1402 of FIG. 14. In some examples, a CCE to REG mapping may be separate for the first CORESET and the second CORESET. In some examples, a PDCCH candidate having an aggregation level L may include 2*L CCEs, where the value "2" represents the two CORESETs associated with the SSS.

At 1304, the UE may determine a first set of L CCE indices for the first CORESET and a second set of L CCE indices for the second CORESET, as described above in connection with 930 of FIG. 9. For example, 1304 may be performed by a CCE indices component 1446 of the apparatus 1402 of FIG. 14. In some examples, a number of coded bits for the PDCCH candidate may be based on a single set of CCE indices. In some examples, a number of coded bits for the PDCCH candidate may be based on a combination of the first set of L CCE indices and the second set of L CCE indices.

At 1306, the UE monitors for a control signal based on the configuration for the SSS, as described above in connection with 940 of FIG. 9. For example, 1306 may be performed by a monitoring component 1450 of the apparatus 1402 of FIG. 14.

At 1308, the UE may receive a control signal based on the configuration for the SSS, as described in connection with the control signal 960 of FIG. 9. For example, 1308 may be performed by the reception component 1430 and/or a control signal component 1452 of the apparatus 1402 of FIG. 14.

Figure 14:
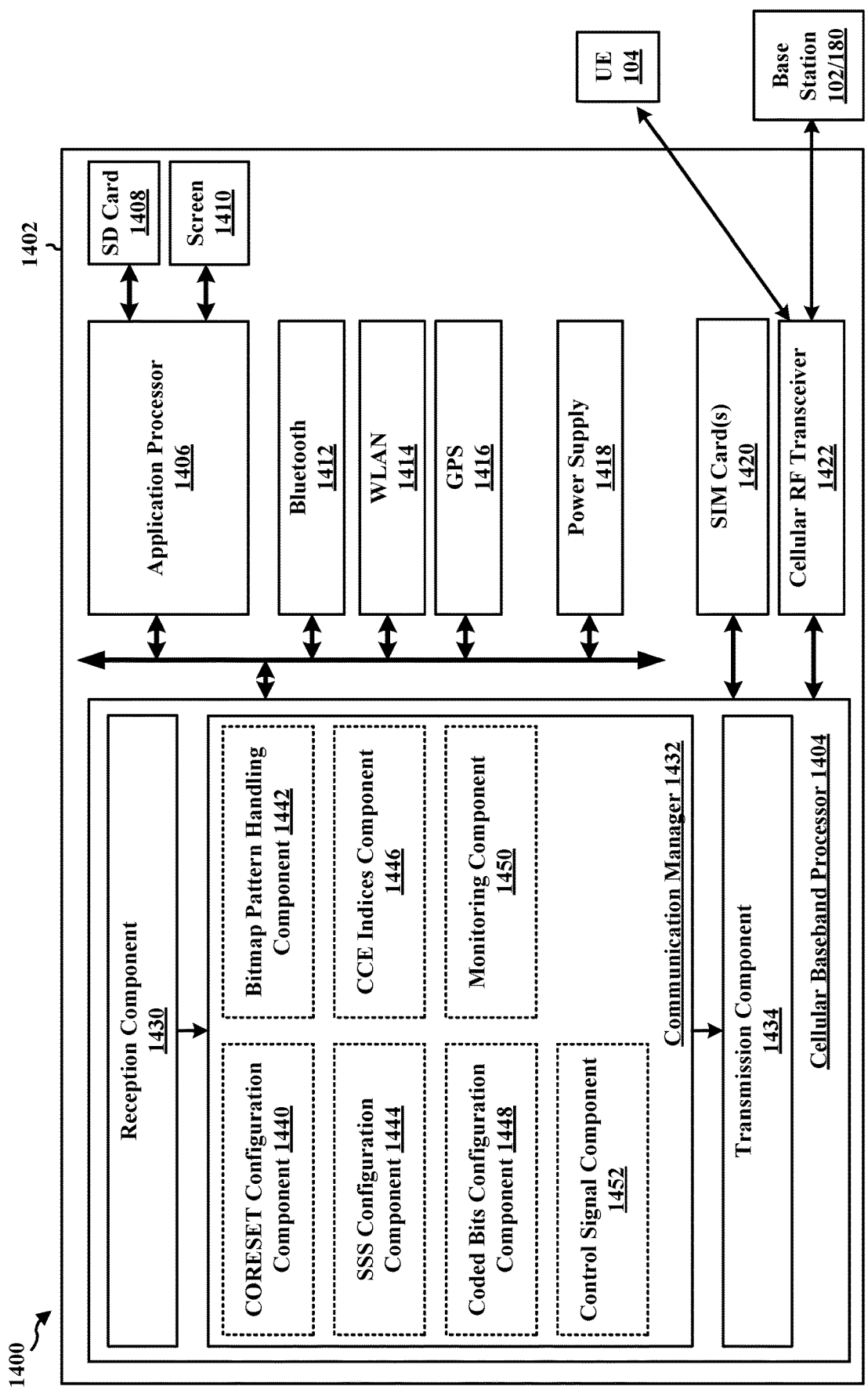
FIG. 14 is a diagram illustrating an example of a hardware implementation for an example apparatus, in accordance with the teachings disclosed herein.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or base station 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the cellular baseband processor 1404, and in another configuration, the apparatus 1402 may be the entire UE (e.g., see the UE 350 of FIG. 3) and include the additional modules of the apparatus 1402.

The communication manager 1432 includes a CORESET configuration component 1440 that is configured to receive a configuration for a CORESET having a first RB set associated with a first TCI state and a second RB set associated with a second TCI state, for example, as described in connection with 1002 of FIG. 10 and/or 1102 of FIG. 11.

The communication manager 1432 also includes a bitmap pattern handling component 1442 that is configured to receive an indication of a pattern in the configuration for the CORESET, for example, as described in connection with 1104 of FIG. 11.

The communication manager 1432 also includes an SSS configuration component 1444 that is configured to receive an SSS configuration associated with at least one of the first RB set and the second RB set of the CORESET, for example, as described in connection with 1106 of FIG. 11. The example SSS configuration component 1444 may also be configured to receive a configuration for an SSS associated with a first CORESET having a first TCI state and a second CORESET having a second TCI state, for example, as described in connection with 1202 of FIG. 12 and/or 1302 of FIG. 13.

The communication manager 1432 also includes a CCE indices component 1446 that is configured to determine a first set of CCE indices for the first RB set and a second set of CCE indices for the second RB set, for example, as described in connection with 1108 of FIG. 11. The example CCE indices component 1446 may also be configured to determine a first set of L CCE indices for the first CORESET and a second set of L CCE indices for the second CORESET, for example, as described in connection with 1304 of FIG. 13.

The communication manager 1432 also includes a coded bits configuration component 1448 that is configured to receive configuration information indicating whether a number of coded bits of the PDCCH is based on CCEs in a single RB set or based on a combined set of CCEs in the first RB set and the second RB set, for example, as described in connection with 1110 of FIG. 11.

The communication manager 1432 also includes a monitoring component 1450 that is configured to monitor for a control signal in the first RB set and the second RB set, for example, as described in connection with 1004 of FIG. 10 and/or 1112 of FIG. 11. The example monitoring component 1450 may also be configured to monitor for a control signal based on the configuration for the SSS, for example, as described in connection with 1204 of FIG. 12 and/or 1306 of FIG. 13.

The communication manager 1432 also includes a control signal component 1452 that is configured to receive a control signal in the monitored RB set, for example, as described in connection with 1114 of FIG. 11. The example control signal component 1452 may also be configured to receive a control signal based on the configuration for the SSS, for example, as described in connection with 1308 of FIG. 13.

The apparatus may include additional components that perform each of the blocks of the algorithm in the flowcharts of FIGS. 10 to 13. As such, each block in the flowcharts of FIGS. 10 to 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving a configuration for a CORESET having a first RB set associated with a first TCI state and a second RB set associated with a second TCI state. The example apparatus 1402 also includes means for monitoring for a control signal in the first RB set and the second RB set.

In another configuration, the example apparatus 1402 also includes means for receiving an SSS configuration associated with at least one of the first RB set and the second RB set of the CORESET.

In another configuration, the example apparatus 1402 also includes means for determining a first set of CCE indices for the first RB set and a second set of CCE indices for the second RB set. The example apparatus 1402 also includes means for determining CCE indices for the PDCCH candidate for the first RB set and for the second RB set based on one or more of: the configured AL, a PDCCH candidate index and a number of PDCCH candidates with the configured AL, a number of CCEs in a corresponding RB set of the CORESET, a carrier indicator field value, a slot number, an RNTI, or a CORESET index. The example apparatus 1402 also includes means for receiving configuration information indicating whether a number of coded bits of the PDCCH candidate is based on CCEs in a single RB set or based on a combined set of CCEs in the first RB set and the second RB set.

In another configuration, the example apparatus 1402 also includes means for receiving an indication of the pattern in the configuration for the CORESET.

The means may be one or more of the components of the apparatus 1402 configured to perform the functions recited by the means. As described supra, the apparatus 1402 may include the TX processor 368, the RX processor 356, and the controller/processor 359. As such, in one configuration, the means may be the TX processor 368, the RX processor 356, and the controller/processor 359 configured to perform the functions recited by the means.

Figure 15:
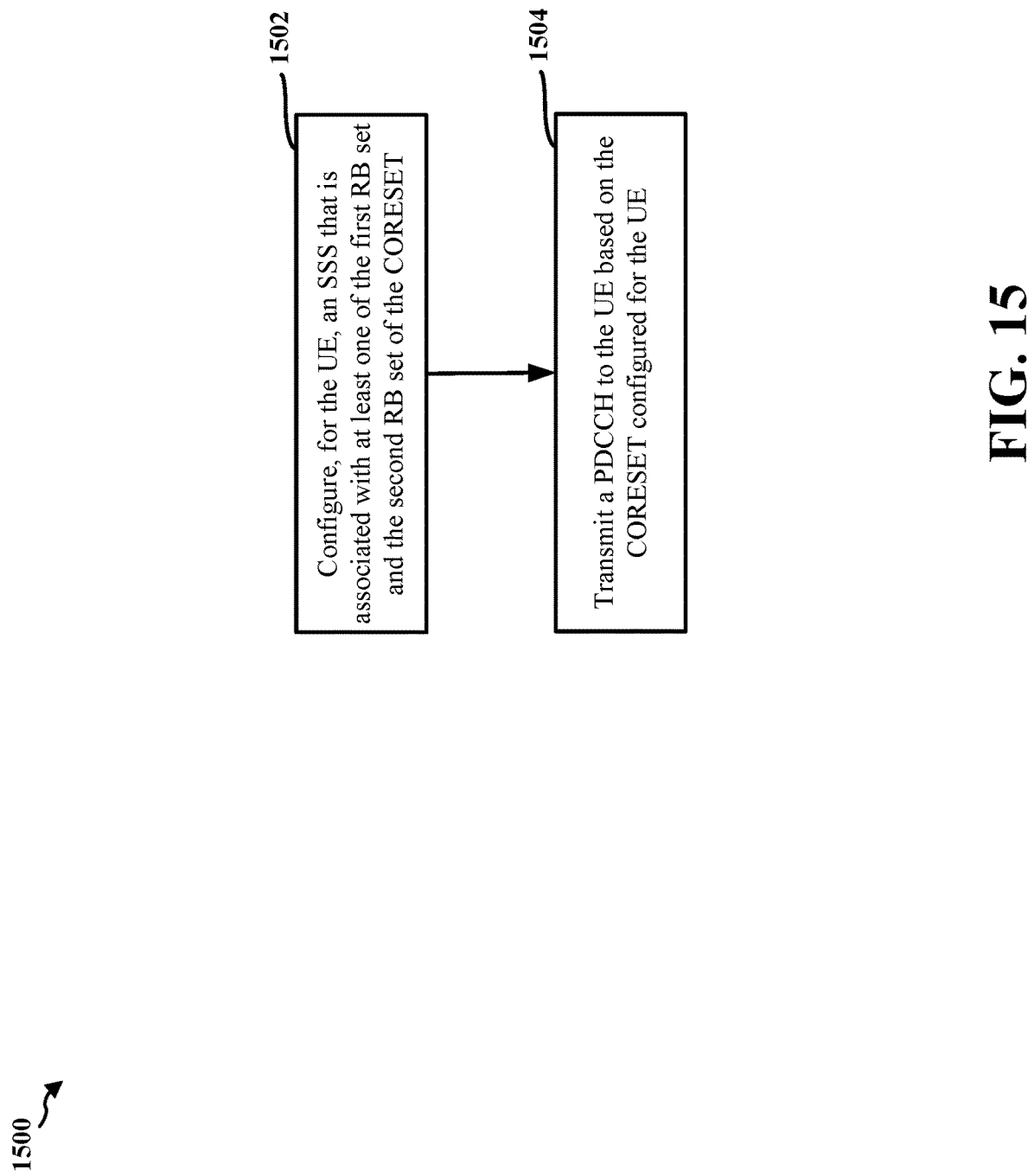
FIG. 15 is a flowchart of a method of wireless communication at a base station, in accordance with the teachings disclosed herein.

FIG. 15 is a flowchart 1500 of a method of wireless communication. The method may be performed by a base station (e.g., the base station 102/180, the base station 310, and/or an apparatus 1902 of FIG. 19). The method may improve the efficient exchange of communication between a base station and a UE based on application of multiple TCI states when monitoring for a control signal.

At 1502, the base station configures, for a UE, a CORESET having a first RB set associated with a first TCI state and a second RB state associated with a second TCI state, as described above in connection with the CORESET configuration 830 of FIG. 8. For example, 1502 may be performed by a CORESET configuration component 1940 of the apparatus 1902 of FIG. 19. In some examples, the base station may configure one or more parameters for the CORESET, such as a CCE to REG mapping type, a precoder granularity, or a PDCCH DMRS scrambling identifier. In some examples, the base station may configure the one or more parameters for the CORESET separately for the first RB set and the second RB set. In some examples, the base station may configure the one or more parameters for the CORESET in common for the first RB set and the second RB set.

In some examples, the base station may configure a first set of frequency domain resources for the first RB set based on a first bitmap and a second set of frequency domain resources for the second RB set based on a second bitmap, as described above in connection with FIGS. 6A, 6B, and/or 6C. In some examples, the base station may configure the first set of frequency domain resources for the first RB set and the second set of frequency domain resources for the second RB set based on a common bitmap, as described above in connection with FIGS. 7A and/or 7B. In some examples, the first set of frequency domain resources and the second set of frequency domain resources may be based on the common bitmap and a rule that indicates a pattern. In some examples, the pattern may be based on an alternating pattern (e.g., as described above in connection with FIG. 7A) or a grouping pattern (e.g., as described above in connection with FIG. 7B). In some such examples, the pattern may include a first half and a second half of groups of RBs indicated in the common bitmap.

At 1504, the base station transmits a PDCCH to the UE based on the CORESET configured for the UE, as described above in connection with the control signal 890 of FIG. 8. For example, 1504 may be performed by the transmission component 1934 and/or a control signal component 1954 of the apparatus 1902 of FIG. 19.

Figure 16:
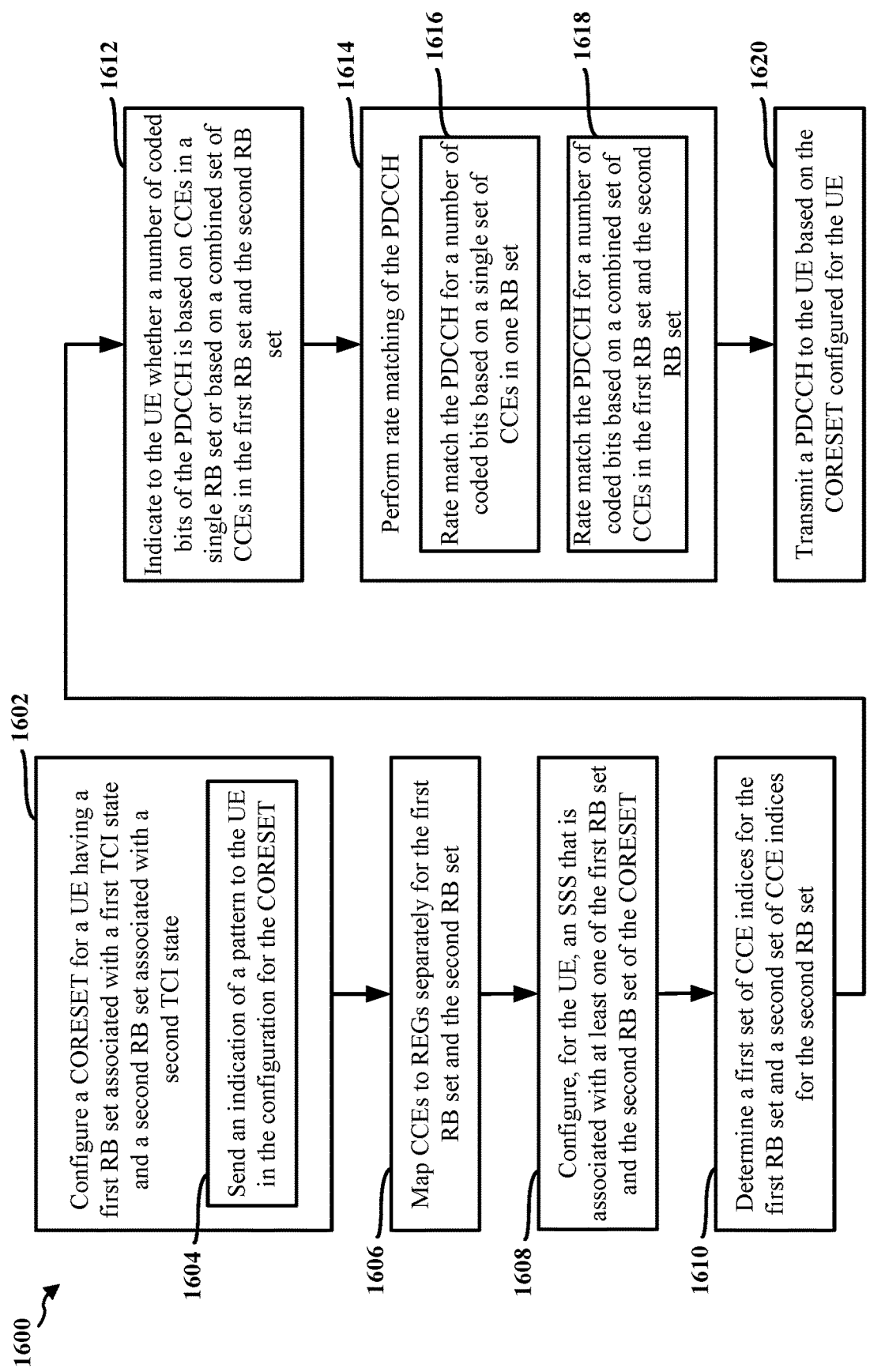
FIG. 16 is a flowchart of a method of wireless communication at a base station, in accordance with the teachings disclosed herein.

FIG. 16 is a flowchart 1600 of a method of wireless communication. The method may be performed by a base station (e.g., the base station 102/180, the base station 310, and/or an apparatus 1902 of FIG. 19). The method may improve the efficient exchange of communication between a base station and a UE based on application of multiple TCI states when monitoring for a control signal.

At 1602, the base station configures, for a UE, a CORESET having a first RB set associated with a first TCI state and a second RB state associated with a second TCI state, as described above in connection with the CORESET configuration 830 of FIG. 8. For example, 1602 may be performed by a CORESET configuration component 1940 of the apparatus 1902 of FIG. 19. In some examples, the base station may configure one or more parameters for the CORESET, such as a CCE to REG mapping type, a precoder granularity, or a PDCCH DMRS scrambling identifier. In some examples, the base station may configure the one or more parameters for the CORESET separately for the first RB set and the second RB set. In some examples, the base station may configure the one or more parameters for the CORESET in common for the first RB set and the second RB set.

In some examples, the base station may configure a first set of frequency domain resources for the first RB set based on a first bitmap and a second set of frequency domain resources for the second RB set based on a second bitmap, as described above in connection with FIGS. 6A, 6B, and/or 6C. In some examples, the base station may configure the first set of frequency domain resources for the first RB set and the second set of frequency domain resources for the second RB set based on a common bitmap, as described above in connection with FIGS. 7A and/or 7B. In some examples, the first set of frequency domain resources and the second set of frequency domain resources may be based on the common bitmap and a rule that indicates a pattern. In some examples, the pattern may be based on an alternating pattern (e.g., as described above in connection with FIG. 7A) or a grouping pattern (e.g., as described above in connection with FIG. 7B). In some such examples, the pattern may include a first half and a second half of groups of RBs indicated in the common bitmap.

In some examples, the base station may send, at 1604, an indication of the pattern to the UE in the configuration for the CORESET, as described above in connection with the CORESET configuration 830 of FIG. 8. For example, 1604 may be performed by a transmission component 1934 of the apparatus 1902 of FIG. 19 and/or a pattern component 1942 of the apparatus 1902 of FIG. 19.

At 1606, the base station may map CCEs to REGs separately for the first RB set and the second RB set, as described above in connection with 810 of FIG. 8. For example, 1606 may be performed by a CCEs to REGs mapping component 1944 of the apparatus 1902 of FIG. 19.

At 1608, the base station may configure, for the UE, an SSS that is associated with at least one of the first RB set and the second RB set of the CORESET, as described above in connection with the SSS configuration 840 of FIG. 8. For example, 1608 may be performed by an SSS configuration component 1946 of the apparatus 1902 of FIG. 19. The SSS may be associated with a single RB set of the CORESET. In such examples, a PDCCH candidate may be based on RBs of the signal RB set. In some examples, the SSS may be associated with multiple RB sets of the CORESET. In such examples, a number of CCEs for a PDCCH candidate may be a multiple of a configured aggregation level.

At 1610, the base station may determine a first set of CCE indices for the first RB set and a second set of CCE indices for the second RB set, as described above in connection with 810 of FIG. 8. For example, 1610 may be performed by a CCE indices component 1948 of the apparatus 1902 of FIG. 19. In some examples, CCE indices for the PDCCH candidate may be determined for the first RB set and for the second RB set based on one or more of the configured AL, a PDCCH candidate index and a number of PDCCH candidates with the configured AL, a number of CCEs in a corresponding RB set of the CORESET, a carrier indicator field value, a slot number, an RNTI, or a CORESET index.

At 1612, the base station may indicate to the UE whether a number of coded bits of the PDCCH are based on CCEs in a single RB set or based on a combined set of CCEs in the first RB set and the second RB set, as described above in connection with the coded bits configuration 860 of FIG. 8. For example, 1612 may be performed by the transmission component 1934 and/or a coded bits configuration component 1950 of the apparatus 1902 of FIG. 19. In some examples, the number of coded bits of the PDCCH candidate may be based on a set of CCEs in a single RB set. In some examples, the number of coded bits of the PDCCH candidate may be based on a combined set of CCEs in the first RB set and the second RB set.

At 1614, the base station may perform rate matching of the PDCCH, as described above in connection with 880 of FIG. 8. In some examples, the base station may, at 1316, rate match the PDCCH for a number of coded bits based on a single set of CCEs in one RB set, as described above in connection with 882 of FIG. 8. In some examples, the base station may, at 1318, rate match the PDCCH for a number of coded bits based on a combined set of CCEs in the first RB set and the second RB set, as described above in connection with 884 of FIG. 8. The performing of the rate matching at 1614, 1616, and/or 1618 may be performed by a rate matching component 1952 of the apparatus 1902 of FIG. 19.

At 1620, the base station transmits a PDCCH to the UE based on the CORESET configured for the UE, as described above in connection with the control signal 890 of FIG. 8. For example, 1620 may be performed by the transmission component 1934 and/or a control signal component 1954 of the apparatus 1902 of FIG. 19.

Figure 17:
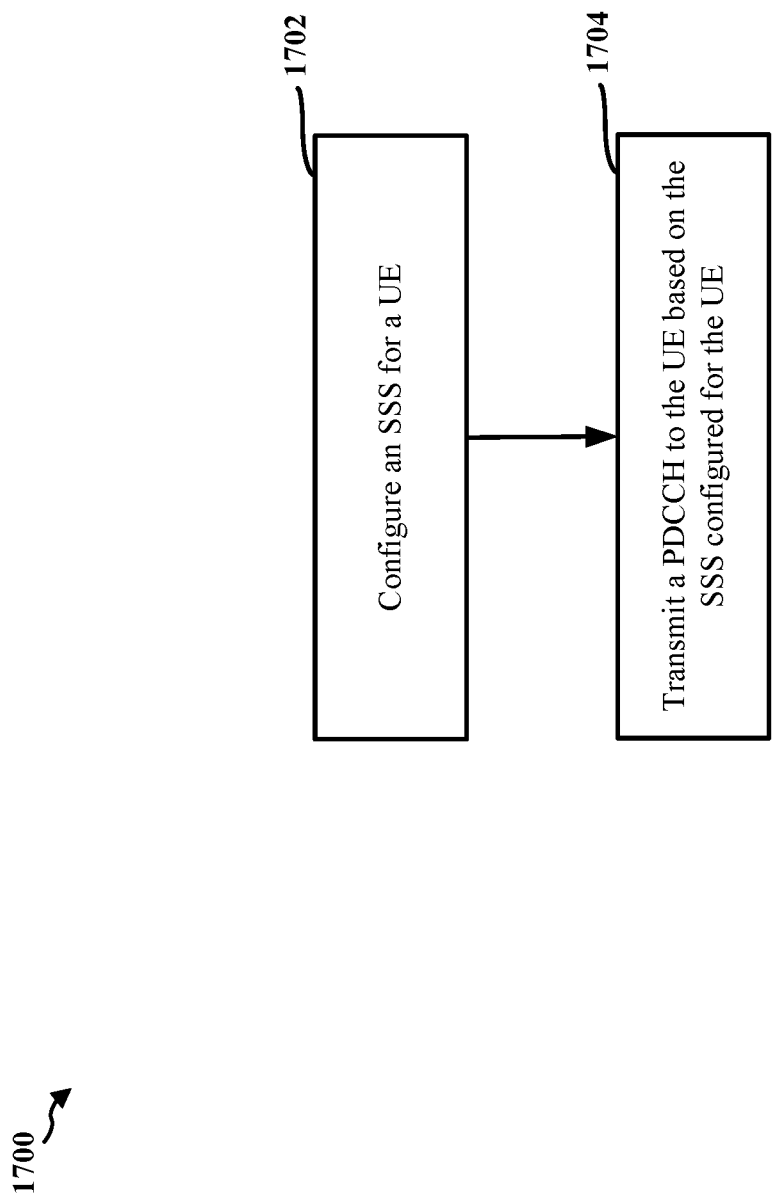
FIG. 17 is a flowchart of a method of wireless communication at a base station, in accordance with the teachings disclosed herein.

FIG. 17 is a flowchart 1700 of a method of wireless communication. The method may be performed by a base station (e.g., the base station 102/180, the base station 310, and/or an apparatus 1902 of FIG. 19). The method may improve the efficient exchange of communication between a base station and a UE based on application of multiple TCI states when monitoring for a control signal.

At 1702, the base station configures, for a UE, an SSS being associated with a first CORESET having a first TCI state and a second CORESET having a second TCI state, as described above in connection with the SSS configuration 920 of FIG. 9. For example, 1702 may be performed by an SSS configuration component 1946 of the apparatus 1902 of FIG. 19.

At 1704, the base station transmits a PDCCH to the UE based on the SSS configured for the UE, as described above in connection with the control signal 960 of FIG. 9. For example, 1704 may be performed by the transmission component 1934 and/or a control signal component 1954 of the apparatus 1902 of FIG. 19.

Figure 18:
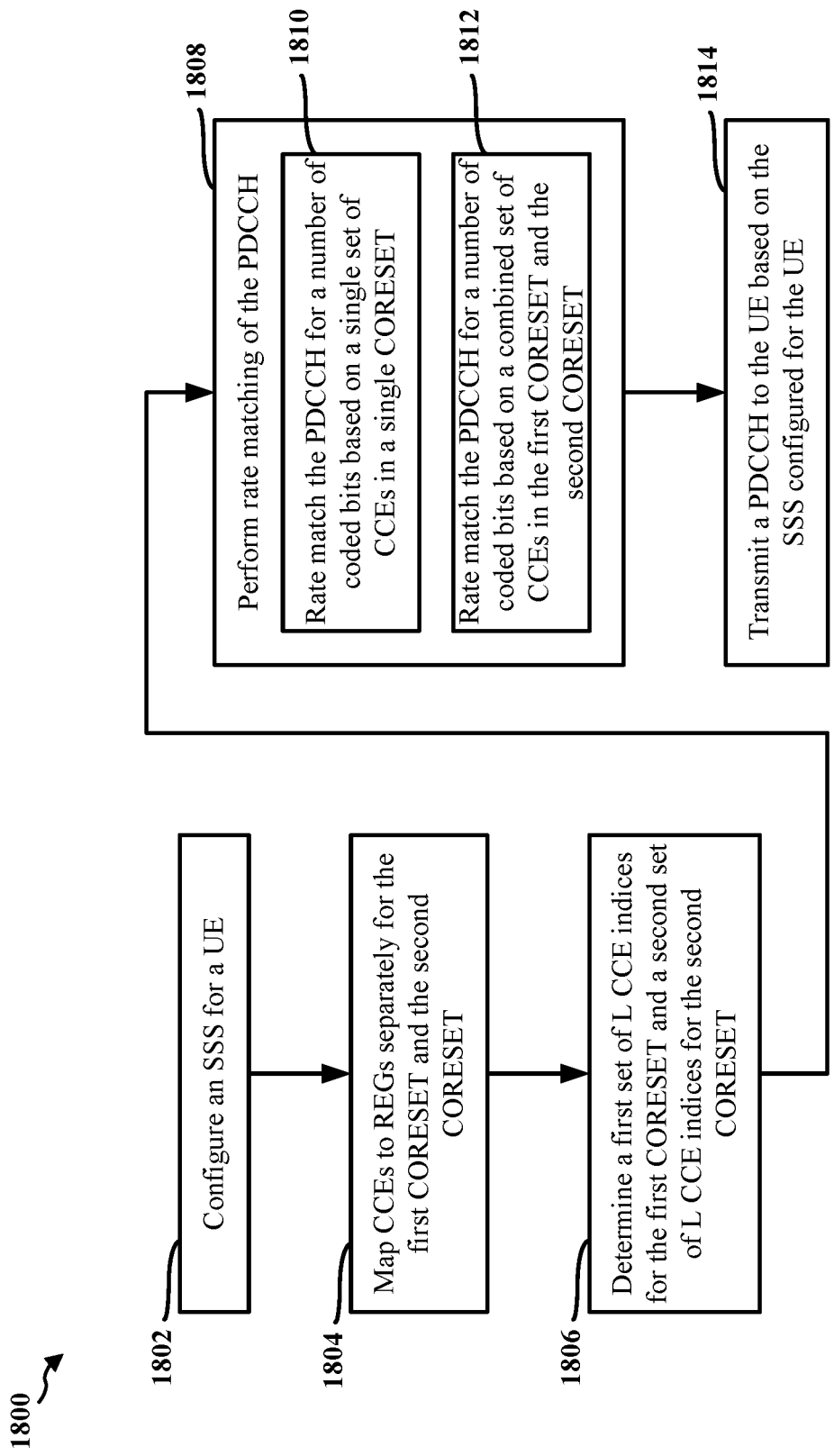
FIG. 18 is a flowchart of a method of wireless communication at a base station, in accordance with the teachings disclosed herein.

FIG. 18 is a flowchart 1800 of a method of wireless communication. The method may be performed by a base station (e.g., the base station 102/180, the base station 310, and/or an apparatus 1902 of FIG. 19). The method may improve the efficient exchange of communication between a base station and a UE based on application of multiple TCI states when monitoring for a control signal.

At 1802, the base station configures, for a UE, an SSS being associated with a first CORESET having a first TCI state and a second CORESET having a second TCI state, as described above in connection with the SSS configuration 920 of FIG. 9. For example, 1802 may be performed by an SSS configuration component 1946 of the apparatus 1902 of FIG. 19.

At 1804, the base station may map CCEs to REGs separately for the first CORESET and the second CORESET, as described above in connection with 910 of FIG. 9. For example, 1804 may be performed by a CCEs to REGs mapping component 1944 of the apparatus 1902 of FIG. 19. In some examples, a PDCCH candidate having an aggregation level L may include 2*L CCEs, where the value "2" represents the CORESETs associated with the SSS.

At 1806, the base station may determine a first set of L CCE indices for the first CORESET and a second set of L CCE indices for the second CORESET, as described above in connection with 910 of FIG. 9. For example, 1806 may be performed by a CCE indices component 1948 of the apparatus 1902 of FIG. 19.

At 1808, the base station may perform rate matching of the PDCCH, as described above in connection with 950 of FIG. 9. In some examples, the base station may, at 1810, rate match the PDCCH for a number of coded bits based on a single set of CCEs in a single CORESET, as described above in connection with 952 of FIG. 9. In some examples, the base station may, at 1812, rate match the PDCCH for a number of coded bits based on a combined set of CCEs in the first CORESET and the second CORESET, as described above in connection with 954 of FIG. 9. The performing of the rate matching at 1808, 1810, and/or 1812 may be performed by a rate matching component 1952 of the apparatus 1902 of FIG. 19.

At 1814, the base station transmits a PDCCH to the UE based on the SSS configured for the UE, as described above in connection with the control signal 960 of FIG. 9. For example, 1814 may be performed by the transmission component 1934 and/or a control signal component 1954 of the apparatus 1902 of FIG. 19.

Figure 19:
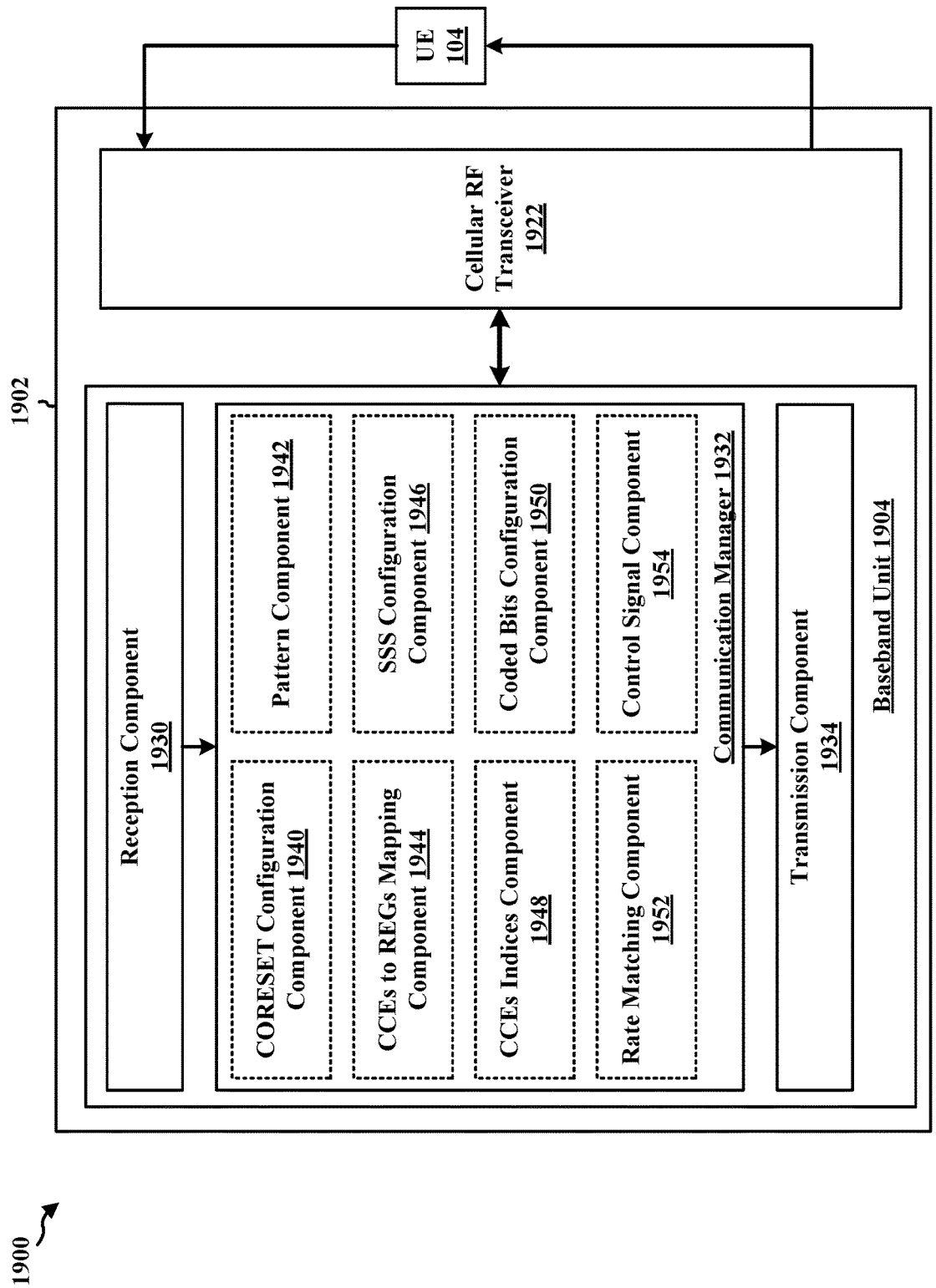
FIG. 19 is a diagram illustrating an example of a hardware implementation for an example apparatus, in accordance with the teachings disclosed herein.

FIG. 19 is a diagram 1900 illustrating an example of a hardware implementation for an apparatus 1902. The apparatus 1902 may be a base station, a component of a base station, or may implement base station functionality. In some aspects, the apparatus 1402 may include a baseband unit 1904. The baseband unit 1904 may communicate through a cellular RF transceiver 1922 with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 includes a CORESET configuration component 1940 that is configured to configure a CORESET for a UE having a first RB set associated with a first TCI state and a second RB set associated with a second TCI state, for example, as described in connection with 1502 of FIG. 15 and/or 1602 of FIG. 16.

The communication manager 1932 also includes a pattern component 1942 that is configured to send an indication of a pattern to the UE in the configuration for the CORESET, for example, as described in connection with 1604 of FIG. 16.

The communication manager 1932 also includes a CCEs to REGs mapping component 1944 that is configured to map CCEs to REGs separately for the first RB set and the second RB set, for example, as described in connection with 1606 of FIG. 16. The example CCEs to REGs mapping component 1944 may also be configured to map CCEs to REGs separately for the first CORESET and the second CORESET, for example, as described in connection with 1804 of FIG. 18.

The communication manager 1932 also includes an SSS configuration component 1946 that is configured to configure, for the UE, an SSS that is associated with at least one of the first RB set and the second RB set of the CORESET, for example, as described in connection with 1608 of FIG. 16. The example SSS configuration component 1946 may also be configured to configure an SSS for a UE, for example, as described in connection with 1702 of FIG. 17 and/or 1802 of FIG. 18.

The communication manager 1932 also includes a CCE indices component 1948 that is configured to determine a first set of CCE indices for the first RB set and a second set of CCE indices for the second RB set, for example, as described in connection with 1610 of FIG. 16. The example CCE indices component 1948 may also be configured to determine a first set of L CCE indices for the first CORESET and a second set of L CCE indices for the second CORESET, for example, as described in connection with 1806 of FIG. 18.

The communication manager 1932 also includes a coded bits configuration component 1950 that is configured to indicate to the UE whether a number of coded bits of the PDCCH is based on CCEs in a single RB set or based on a combined set of CCEs in the first RB set and the second RB set, for example, as described in connection with 1612 of FIG. 16.

The communication manager 1932 also includes a rate matching component 1952 that is configured to perform rate matching of the PDCCH, for example, as described in connection with 1614 of FIG. 16. The example rate matching component 1952 may also be configured to rate match the PDCCH for a number of coded bits based on a single set of CCEs in one RB set, for example, as described in connection with 1616 of FIG. 16. The example rate matching component 1952 may also be configured to rate match the PDCCH for a number of coded bits based on a combined set of CCEs in the first RB set and the second RB set, for example, as described in connection with 1618 of FIG. 16. The example rate matching component 1952 may also be configured to perform rate matching of the PDCCH, for example, as described in connection with 1808 of FIG. 18. The example rate matching component 1952 may also be configured to rate match the PDCCH for a number of coded bits based on a single set of CCEs in a single CORESET, for example, as described in connection with 1810 of FIG. 18. The example rate matching component 1952 may also be configured to rate match the PDCCH for a number of coded bits based on a combined set of CCEs in the first CORESET and the second CORESET, for example, as described in connection with 1812 of FIG. 18.

The communication manager 1932 also includes a control signal component 1954 that is configured to transmit a PDCCH to the UE based on the CORESET configured for the UE, for example, as described in connection with 1504 of FIG. 15 and/or 1620 of FIG. 16. The example control signal component 1954 may also be configured to transmit a PDCCH to the UE based on the SSS configured for the UE, for example, as described in connection with 1704 of FIG. 17 and/or 1814 of FIG. 18.

The apparatus may include additional components that perform each of the blocks of the algorithm in the flowcharts of FIGS. 15 to 18. As such, each block in the flowcharts of FIGS. 15 to 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the cellular baseband processor 1904, includes means for receiving a configuration for an SSS associated with a first CORESET having a first TCI state and a second CORESET having a second TCI state. The example apparatus 1902 also includes means for monitoring for a control signal based on the configuration for the SSS.

In another configuration, the example apparatus 1902 also includes means for determining a first set of L CCE indices for the first CORESET and a second set of L CCE indices for the second CORESET.

The means may be one or more of the components of the apparatus 1902 configured to perform the functions recited by the means. As described supra, the apparatus 1902 may include the TX processor 316, the RX processor 370, and the controller/processor 375. As such, in one configuration, the means may be the TX processor 316, the RX processor 370, and the controller/processor 375 configured to perform the functions recited by the means.

The aspects presented herein may enable two or more TCI states for PDCCH. For example, disclosed techniques employ multi-cluster CORESETs where different clusters represent different RB sets. Additionally, each RB set may be associated with a different respective TCI state. Accordingly, example techniques disclosed herein enable multi-TCI states for PDCCH.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a user equipment (UE) including at least processor coupled to a memory and configured to receive a configuration for a CORESET having a first RB set associated with a first TCI state and a second RB set associated with a second TCI state; and monitor for a control signal in the first RB set and the second RB set.

Aspect 2 is the apparatus of aspect 1, further including that a CCE to REG mapping is separate for the first RB set and the second RB set.

Aspect 3 is the apparatus of any of aspects 1 and 2, further including that the memory and the at least one processor are further configured to: receive an SSS configuration associated with at least one of the first RB set and the second RB set of the CORESET.

Aspect 4 is the apparatus of any of aspects 1 to 3, further including that the SSS configuration is associated with a single RB set of the CORESET, and wherein a PDCCH candidate is based on RBs of the single RB set.

Aspect 5 is the apparatus of any of aspects 1 to 4, further including that the SSS configuration is associated with multiple RB sets of the CORESET, and where a number of CCEs for a PDCCH candidate is a multiple of a configured AL.

Aspect 6 is the apparatus of any of aspects 1 to 5, further including that the memory and the at least one processor are further configured to: determine a first set of CCE indices for the first RB set and a second set of CCE indices for the second RB set.

Aspect 7 is the apparatus of any of aspects 1 to 6, further including that CCE indices for the PDCCH candidate are determined for the first RB set and for the second RB set based on one or more of: the configured AL, a PDCCH candidate index and a number of PDCCH candidates with the configured AL, a number of CCEs in a corresponding RB set of the CORESET, a carrier indicator field value, a slot number, a RNTI, or a CORESET index.

Aspect 8 is the apparatus of any of aspects 1 to 7, further including that a number of coded bits of the PDCCH candidate is based on a set of CCEs in a single RB set.

Aspect 9 is the apparatus of any of aspects 1 to 7, further including that a number of coded bits of the PDCCH candidate is based on a combined set of CCEs in the first RB set and the second RB set.

Aspect 10 is the apparatus of any of aspects 1 to 9, further including that the memory and the at least one processor are further configured to: receive configuration information indicating whether a number of coded bits of the PDCCH candidate is based on CCEs in a single RB set or based on a combined set of CCEs in the first RB set and the second RB set.

Aspect 11 is the apparatus of any of aspects 1 to 10, further including that the configuration for the CORESET includes one or more parameters that is configured separately for the first RB set and the second RB set, the one or more parameters including at least one of: a CCE to REG mapping type, a precoder granularity, or a PDCCH DMRS scrambling identifier.

Aspect 12 is the apparatus of any of aspects 1 to 10, further including that the configuration for the CORESET includes one or more parameters that is configured in common for the first RB set and the second RB set, one or more parameter including at least one of: a CCE to REG mapping type, a precoder granularity, or a PDCCH DMRS scrambling identifier.

Aspect 13 is the apparatus of any of aspects 1 to 12, further including that a first set of frequency domain resources for the first RB set is configured in a first bitmap and a second set of frequency domain resources for the second RB set is configured in a second bitmap.

Aspect 14 is the apparatus of any of aspects 1 to 12, further including that a first set of frequency domain resources for the first RB set and a second set of frequency domain resources for the second RB set are configured in a common bitmap.

Aspect 15 is the apparatus of any of aspects 1 to 14, further including that the first set of frequency domain resources and the second set of frequency domain resources are based on the common bitmap and a rule that indicates a pattern.

Aspect 16 is the apparatus of any of aspects 1 to 15, further including that the pattern is based on an alternating pattern or a grouping pattern that includes a first half and a second half of groups of RBs indicated in the common bitmap.

Aspect 17 is the apparatus of any of aspects 1 to 16, further including that the memory and the at least one processor are further configured to: receive an indication of the pattern in the configuration for the CORESET.

Aspect 18 is the apparatus of any of aspects 1 to 17, further including a transceiver coupled to the at least one processor.

Aspect 19 is a method of wireless communication for implementing any of aspects 1 to 18.

Aspect 20 is an apparatus for wireless communication including means for implementing any of aspects 1 to 18.

Aspect 21 is a non-transitory computer-readable storage medium storing computer executable code, where the code, when executed, causes a processor to implement any of aspects 1 to 18.

Aspect 22 is an apparatus for wireless communication at a UE including at least processor coupled to a memory and configured to receive a configuration for an SSS associated with a first CORESET having a first TCI state and a second CORESET having a second TCI state; and monitor for a control signal based on the configuration for the SSS.

Aspect 23 is the apparatus of aspect 22, further including that a CCE to REG mapping is separate for the first CORESET and the second CORESET.

Aspect 24 is the apparatus of any of aspects 22 and 23, further including that a PDCCH candidate having an aggregation level L includes 2*L CCEs.

Aspect 25 is the apparatus of any of aspects 22 to 24, further including that the memory and the at least one processor are further configured to: determine a first set of L CCE indices for the first CORESET and a second set of L CCE indices for the second CORESET.

Aspect 26 is the apparatus of any of aspects 22 to 25, further including that a number of coded bits for the PDCCH candidate is based on a single set of CCE indices.

Aspect 27 is the apparatus of any of aspects 22 to 25, further including that a number of coded bits for the PDCCH candidate is based on a combination of the first set of L CCE indices and the second set of L CCE indices.

Aspect 28 is the apparatus of any of aspects 22 to 27, further including a transceiver coupled to the at least one processor.

Aspect 29 is a method of wireless communication for implementing any of aspects 22 to 28.

Aspect 30 is an apparatus for wireless communication including means for implementing any of aspects 22 to 28.

Aspect 31 is a non-transitory computer-readable storage medium storing computer executable code, where the code, when executed, causes a processor to implement any of aspects 22 to 28.

Aspect 32 is an apparatus for wireless communication at a base station including at least processor coupled to a memory and configured to configure a CORESET for a UE, the CORESET having a first RB set associated with a first TCI state and a second RB set associated with a second TCI state; and transmit a PDCCH to the UE based on the CORESET configured for the UE.

Aspect 33 is the apparatus of aspect 32, further including that the memory and the at least one processor are further configured to: map CCEs to REGs separately for the first RB set and the second RB set.

Aspect 34 is the apparatus of any of aspects 32 and 33, further including that the memory and the at least one processor are further configured to: configure, for the UE, an SSS that is associated with at least one of the first RB set and the second RB set of the CORESET.

Aspect 35 is the apparatus of any of aspects 32 to 34, further including that the SSS is associated with a single RB set of the CORESET, where a PDCCH candidate is based on RBs of the single RB set.

Aspect 36 is the apparatus of any of aspects 32 to 35, further including that the SSS is associated with multiple RB sets of the CORESET, and where a number of CCEs for a PDCCH candidate is a multiple of a configured AL.

Aspect 37 is the apparatus of any of aspects 32 to 36, further including that the memory and the at least one processor are further configured to: determine a first set of CCE indices for the first RB set and a second set of CCE indices for the second RB set.

Aspect 38 is the apparatus of any of aspects 32 to 37, further including that CCE indices for the PDCCH candidate are determined for the first RB set and for the second RB set based on one or more of: the configured AL, a PDCCH candidate index and a number of PDCCH candidates with the configured AL, a number of CCEs in a corresponding RB set of the CORESET, a carrier indicator field value, a slot number, an RNTI, or a CORESET index.

Aspect 39 is the apparatus of any of aspects 32 to 38, further including that the memory and the at least one processor are further configured to: rate match the PDCCH for a number of coded bits based on a single set of CCEs in one RB set.

Aspect 40 is the apparatus of any of aspects 32 to 38, further including that the memory and the at least one processor are further configured to: rate match the PDCCH for a number of coded bits based on a combined set of CCEs in the first RB set and the second RB set.

Aspect 41 is the apparatus of any of aspects 32 to 40, further including that the memory and the at least one processor are further configured to: indicate to the UE whether a number of coded bits of the PDCCH is based on CCEs in a single RB set or based on a combined set of CCEs in the first RB set and the second RB set.

Aspect 42 is the apparatus of any of aspects 32 to 41, further including that the memory and the at least one processor are further configured to: configure one or more parameters for the CORESET separately for the first RB set and the second RB set, the one or more parameters including at least one of: a CCE to REG mapping type, a precoder granularity, or a PDCCH DMRS scrambling identifier.

Aspect 43 is the apparatus of any of aspects 32 to 41, further including that the memory and the at least one processor are further configured to: configure one or more parameters for the CORESET in common for the first RB set and the second RB set, one or more parameter including at least one of: a CCE to REG mapping type, a precoder granularity, or a PDCCH DMRS scrambling identifier.

Aspect 44 is the apparatus of any of aspects 32 to 43, further including that the memory and the at least one processor are further configured to: configure a first set of frequency domain resources for the first RB set based on a first bitmap and a second set of frequency domain resources for the second RB set based on a second bitmap.

Aspect 45 is the apparatus of any of aspects 32 to 43, further including that the memory and the at least one processor are further configured to: configure a first set of frequency domain resources for the first RB set and a second set of frequency domain resources for the second RB set based on a common bitmap.

Aspect 46 is the apparatus of any of aspects 32 to 45, further including that the first set of frequency domain resources and the second set of frequency domain resources are based on the common bitmap and a rule that indicates a pattern.

Aspect 47 is the apparatus of any of aspects 32 to 46, further including that the pattern is based on an alternating pattern or a grouping pattern that includes a first half and a second half of groups of RBs indicated in the common bitmap.

Aspect 48 is the apparatus of any of aspects 32 to 47, further including that the memory and the at least one processor are further configured to: send an indication of the pattern to the UE in the configuration for the CORESET.

Aspect 49 is the apparatus of any of aspects 32 to 48, further including a transceiver coupled to the at least one processor.

Aspect 50 is a method of wireless communication for implementing any of aspects 32 to 49.

Aspect 51 is an apparatus for wireless communication including means for implementing any of aspects 32 to 49.

Aspect 52 is a non-transitory computer-readable storage medium storing computer executable code, where the code, when executed, causes a processor to implement any of aspects 32 to 49.

Aspect 53 is an apparatus for wireless communication at a base station including at least processor coupled to a memory and configured to configure an SSS for a UE, the SSS being associated with a first CORESET having a first TCI state and a second CORESET having a second TCI state; and transmit a PDCCH to the UE based on the SSS configured for the UE.

Aspect 54 is the apparatus of aspect 53, further including that the memory and the at least one processor are further configured to: map CCEs to REGs separately for the first CORESET and the second CORESET.

Aspect 55 is the apparatus of any of aspects 53 and 54, further including that a PDCCH candidate having an aggregation level L includes 2*L CCEs.

Aspect 56 is the apparatus of any of aspects 53 to 55, further including that the memory and the at least one processor are further configured to: determine a first set of L CCE indices for the first CORESET and a second set of L CCE indices for the second CORESET.

Aspect 57 is the apparatus of any of aspects 53 to 56, further including that the memory and the at least one processor are further configured to: rate match the PDCCH for a number of coded bits based on a single set of CCEs in a single CORESET.

Aspect 58 is the apparatus of any of aspects 53 to 56, further including that the memory and the at least one processor are further configured to: rate match the PDCCH for a number of coded bits based on a combined set of CCEs in the first CORESET and the second CORESET.

Aspect 59 is the apparatus of any of aspects 53 to 58, further including a transceiver coupled to the at least one processor.

Aspect 60 is a method of wireless communication for implementing any of aspects 53 to 59.

Aspect 61 is an apparatus for wireless communication including means for implementing any of aspects 53 to 59.

Aspect 62 is a non-transitory computer-readable storage medium storing computer executable code, where the code, when executed, causes a processor to implement any of aspects 53 to 59.

What is claimed is:

1. An apparatus for wireless communication at a user equipment (UE), comprising:
a memory; and
at least one processor coupled to the memory, wherein the at least one processor is configured to:
receive a configuration for a control resource set (CORESET) having a first resource block (RB) set associated with a first transmission configuration indicator (TCI) state and a second RB set associated with a second TCI state;
determine a first set of control channel element (CCE) indices for the first RB set and a second set of CCE indices for the second RB set;
receive a search space set (SSS) configuration associated with at least one of the first RB set and the second RB set of the CORESET, wherein the SSS configuration is associated with multiple RB sets of the CORESET, wherein a number of CCEs for a physical downlink control channel (PDCCH) candidate is a multiple of a configured aggregation level (AL), and wherein a number of coded bits of the PDCCH candidate is based on a set of CCEs in a single RB set; and
monitor for a control signal in the first RB set and the second RB set.

2. The apparatus of claim 1, wherein a CCE to resource element group (REG) mapping is separate for the first RB set and the second RB set.

3. The apparatus of claim 1, wherein CCE indices for the PDCCH candidate are determined for the first RB set and for the second RB set based on one or more of:
the configured AL,
a PDCCH candidate index and a number of PDCCH candidates with the configured AL,
a number of CCEs in a corresponding RB set of the CORESET,
a carrier indicator field value,
a slot number,
a radio network temporary identifier (RNTI), or
a CORESET index.

4. The apparatus of claim 1, wherein the configuration for the CORESET includes one or more parameters that is configured separately for the first RB set and the second RB set, the one or more parameters including at least one of:
a CCE to resource element group (REG) mapping type,
a precoder granularity, or
a physical downlink control channel (PDCCH) demodulation reference signal (DMRS) scrambling identifier.

5. The apparatus of claim 1, wherein the configuration for the CORESET includes one or more parameters that is configured in common for the first RB set and the second RB set, one or more parameter including at least one of:
a CCE to resource element group (REG) mapping type,
a precoder granularity, or
a physical downlink control channel (PDCCH) demodulation reference signal (DMRS) scrambling identifier.

6. The apparatus of claim 1, wherein a first set of frequency domain resources for the first RB set is configured in a first bitmap and a second set of frequency domain resources for the second RB set is configured in a second bitmap.

7. The apparatus of claim 1, further comprising a transceiver coupled to the at least one processor.

8. An apparatus for wireless communication at a user equipment (UE), comprising:
a memory; and
at least one processor coupled to the memory, wherein the at least one processor is configured to:
receive a configuration for a control resource set (CORESET) having a first resource block (RB) set associated with a first transmission configuration indicator (TCI) state and a second RB set associated with a second TCI state, wherein a first set of frequency domain resources for the first RB set and a second set of frequency domain resources for the second RB set are configured in a common bitmap, wherein the first set of frequency domain resources and the second set of frequency domain resources are based on the common bitmap and a rule that indicates a pattern;

determine a first set of control channel element (CCE) indices for the first RB set and a second set of CCE indices for the second RB set;

receive an indication of the pattern in the configuration for the CORESET; and monitor for a control signal in the first RB set and the second RB set.

9. A method of wireless communication performed by a user equipment (UE), comprising:

receiving a configuration for a control resource set (CORESET) having a first resource block (RB) set associated with a first transmission configuration indicator (TCI) state and a second RB set associated with a second TCI state, wherein a first set of frequency domain resources for the first RB set and a second set of frequency domain resources for the second RB set are configured in a common bitmap, wherein the first set of frequency domain resources and the second set of frequency domain resources are based on the common bitmap and a rule that indicates a pattern, and wherein the configuration includes an indication of the pattern;

receiving a search space set (SSS) configuration associated with at least one of the first RB set and the second RB set of the CORESET, wherein the SSS configuration is associated with multiple RB sets of the CORESET, and wherein a number of control channel elements (CCEs) for a physical downlink control channel (PDCCH) candidate is a multiple of a configured aggregation level (AL);

determining a first set of CCE indices for the first RB set and a second set of CCE indices for the second RB set;

receiving configuration information indicating whether a number of coded bits of the PDCCH candidate is based on CCEs in a single RB set or based on a combined set of CCEs in the first RB set and the second RB set; and monitoring for a control signal in the first RB set and the second RB set.

10. The method of claim 9, wherein a control channel element (CCE) to resource element group (REG) mapping is separate for the first RB set and the second RB set.

11. The method of claim 9, wherein the CCE indices for the PDCCH candidate of for the first RB set and for the second RB set are based on one or more of:

the configured AL, a PDCCH candidate index and a number of PDCCH candidates with the configured AL, a number of CCEs in a corresponding RB set of the CORESET, a carrier indicator field value, a slot number, a radio network temporary identifier (RNTI), or a CORESET index.

12. The method of claim 9, wherein the configuration for the CORESET includes one or more parameters that is configured separately for the first RB set and the second RB set, the one or more parameters including at least one of:

a control channel element (CCE) to resource element group (REG) mapping type, a precoder granularity, or a physical downlink control channel (PDCCH) demodulation reference signal (DMRS) scrambling identifier.

13. The method of claim 9, wherein the configuration for the CORESET includes one or more parameters that is configured in common for the first RB set and the second RB set, one or more parameter including at least one of:

a control channel element (CCE) to resource element group (REG) mapping type, a precoder granularity, or a physical downlink control channel (PDCCH) demodulation reference signal (DMRS) scrambling identifier.

14. The method of claim 9, wherein a first set of frequency domain resources for the first RB set is configured in a first bitmap and a second set of frequency domain resources for the second RB set is configured in a second bitmap.

15. An apparatus for wireless communication at a user equipment (UE), comprising:

a memory; and at least one processor coupled to the memory, wherein the at least one processor is configured to:

receive a configuration for a control resource set (CORESET) having a first resource block (RB) set associated with a first transmission configuration indicator (TCI) state and a second RB set associated with a second TCI state;

determine a first set of control channel element (CCE) indices for the first RB set and a second set of CCE indices for the second RB set;

receive a search space set (SSS) configuration associated with at least one of the first RB set and the second RB set of the CORESET, wherein the SSS configuration is associated with multiple RB sets of the CORESET, and wherein a number of CCEs for a physical downlink control channel (PDCCH) candidate is a multiple of a configured aggregation level (AL), wherein a number of coded bits of the PDCCH candidate is based on a combined set of CCEs in the first RB set and the second RB set; and monitor for a control signal in the first RB set and the second RB set.

16. An apparatus for wireless communication at a user equipment (UE), comprising:

a memory; and at least one processor coupled to the memory, wherein the at least one processor is configured to:

receive a configuration for a control resource set (CORESET) having a first resource block (RB) set associated with a first transmission configuration indicator (TCI) state and a second RB set associated with a second TCI state;

determine a first set of control channel element (CCE) indices for the first RB set and a second set of CCE indices for the second RB set;

receive a search space set (SSS) configuration associated with at least one of the first RB set and the second RB set of the CORESET, wherein the SSS configuration is associated with multiple RB sets of the CORESET, and wherein a number of CCEs for a physical downlink control channel (PDCCH) candidate is a multiple of a configured aggregation level (AL);

receive configuration information indicating whether a number of coded bits of the PDCCH candidate is based on CCEs in a single RB set or based on a combined set of CCEs in the first RB set and the second RB set; and monitor for a control signal in the first RB set and the second RB set.

\* \* \* \* \*